United States Patent [19]
Iwauchi et al.

[11] Patent Number: 5,841,492
[45] Date of Patent: Nov. 24, 1998

[54] LIQUID CRYSTAL DISPLAY DEVICE

[75] Inventors: Kenichi Iwauchi, Funabashi; Kazuhiko Tsuda, Tenri; Naofumi Kimura, Nabari, all of Japan

[73] Assignee: Sharp Kabushiki Kaisha, Osaka, Japan

[21] Appl. No.: 556,816

[22] Filed: Nov. 2, 1995

[30] Foreign Application Priority Data

Nov. 2, 1994 [JP] Japan ................................ 6-269438
Feb. 27, 1995 [JP] Japan ................................ 7-038801

[51] Int. Cl.⁶ .............................................. G02F 1/1347
[52] U.S. Cl. .............................................................. 349/74
[58] Field of Search .................................. 349/74, 78, 79, 349/80, 106

[56] References Cited

U.S. PATENT DOCUMENTS

| | | | |
|---|---|---|---|
| 4,610,507 | 9/1986 | Kamamori et al. | 349/80 |
| 4,877,309 | 10/1989 | Takamatsu . | |
| 4,886,343 | 12/1989 | Johnson . | |
| 4,966,441 | 10/1990 | Conner | 349/80 |
| 5,015,074 | 5/1991 | Clerc et al. . | |
| 5,220,444 | 6/1993 | Mitsui et al. . | |
| 5,508,831 | 4/1996 | Nakamura et al. | 349/74 |

FOREIGN PATENT DOCUMENTS 6202099  7/1994  Japan .

*Primary Examiner*—William L. Sikes
*Assistant Examiner*—James A. Dudek

[57] ABSTRACT

A liquid crystal display device comprising: a color filter layer having a set of a cyan color filter, a magenta color filter, a yellow color filter for each pixel, each of the color filters being aligned in parallel with each other, a first liquid crystal layer, provided for the color filters, for changing transmittance of light within a first range of wavelengths when an external electric field is applied thereto, and a second liquid crystal layer, provided for the color filters, for changing transmittance of light within a second range of wavelength when an external electric field is applied thereto, the first range of wavelengths being different from the second range of wavelengths. The color filter layer, and first and second liquid crystal layers can be laminated in an arbitrary order. As a result, a liquid crystal display device which realizes a high efficiency of light and bright multi-color display can be provided.

25 Claims, 12 Drawing Sheets

VIEWING ANGLES WHEN
PARALLAX IS CONCERNED

VIEWING ANGLES WHEN
PARALLAX IS CONCERNED

LIQUID CRYSTAL DISPLAY DEVICE

FIELD OF THE INVENTION

The present invention relates to a liquid crystal display device which realizes a multi-color display through additive and subtractive color processes.

BACKGROUND OF THE INVENTION

Liquid crystal display devices have been used extensively in various products including watches, desk calculators, notebook personal computers, word processors, and television receivers.

A so-called TN (Twisted Nematic) mode in which the molecular alignment of liquid crystals within a liquid crystal cell is twisted about 90° at the initial alignment is known. In the TN mode, a monochrome display is obtained by exploiting the optical characteristics of a liquid crystal cell sandwiched by a pair of polarizing plates; the optical characteristics referred herein mean optical rotation characteristics when no voltage is applied to the liquid crystal cell and optical-rotation resolution characteristics when a voltage is applied to the same.

On the other hand, a full-color or multi-color display is obtained by exploiting the above-mentioned optical switching characteristics through the additive mixture process using a set of red, green, and blue microscopic color filters provided in the liquid crystal cell for each pixel. The principle of this color display is adopted to a transmission type liquid crystal display device such as a liquid crystal television set driven by the active-matrix or multiplex-matrix drive.

An STN (Super Twisted Nematic) mode is extensively used for word processor's display devices. In this mode, a cell structure is similar to that of the TN mode except that a twist angle of the liquid crystals is set in a range between 180° and 270°. More precisely, the twist angle of the liquid crystals is set to 90° or more and further a set angle of each polarizing plate in a polarizing direction is optimized. Accordingly, an abrupt distortion of molecular alignment caused by an increase of an applied voltage is reflected on a change of the liquid crystals' birefringence. As a result, electro-optic characteristics with a sharp threshold can be obtained, which makes the STN mode more advantageous and suitable for a liquid crystal display device driven by the multiplex-matrix drive.

However, the STN mode has a drawback that the background of the display becomes yellowish green, dark blue, etc. due to the birefringence of the liquid crystals. This drawback can be eliminated by a liquid crystal display device which enables a monochrome display by correcting colors. Colors are corrected by laminating an optical compensation panel or a phase difference plate made of polymers such as polycarbonate to an STN liquid crystal panel. A full-color or multi-color display in the STN mode is obtained based on the same operating principle as that of the TN mode.

For an application requiring wide viewing angles, a socalled guest-host mode is adopted, in which a dye (dichroic dye) whose absorbance of light differs in molecular's short and long axis directions is added to the liquid crystals. The guest-host mode includes a Heilmeier type which uses a polarizing plate, a White-Taylor (phase change) type which does not use the polarizing plate, a double-layer type, etc, all of which are based on the same operating principle. To be more specific, in this principle, the molecular alignment of a dye is controlled indirectly by controlling the molecular alignment of the liquid crystals with an application of a voltage, and a display is obtained by exploiting a difference of absorbance of light in the axis directions of the dye molecules. In addition, a color display can be obtained by combining a color filter with a guest-host cell containing a dye which absorbs a visible ray in a specific range of wavelengths or a dye which shows black.

A color display obtained by laminating liquid crystal layers containing dichroic dyes is disclosed in, for example, International Publication WO86/05282 (Japanese Publication Tokuhyosyo No. 62-502780(1987) and U.S. Pat. No. 4,953,953. FIG. 15 shows a double-layer type liquid crystal display device using the dichroic dyes. Capsules of liquid crystals 51, 52, and 53 each containing their respective dyes are aligned in parallel in one layer, and three pairs of capsules of liquid crystal pixels 51a•51b, 52a•52b, and 53a•53b are layered in a vertical direction, respectively. The colors of the dyes contained in each pair are complementary to each other.

More specifically, assuming that the liquid crystal pixel 51a, 52a, and 53a respectively contain a red dye, a green dye, and a blue dye, then the liquid crystal pixel 51a is layered atop of the liquid crystal pixel 51b which contains a cyan dye, a complementary color to red. Likewise, the liquid crystal pixels 52a and 53a are respectively layered atop of the liquid crystal pixels 52b and 53b which respectively contain a magenta dye and a yellow dye to make pairs of complementary colors, green•magenta and blue•yellow respectively. A full-color display is obtained by driving the capsules of the liquid crystals separately while using a set of three dot elements for one pixel. For instance, a pixel is displayed in red by applying a voltage only to the liquid crystal pixel 51b containing the cyan dye to make the liquid crystal pixel 51b transparent, while turning off the electrical connection of all the other liquid crystal pixels.

A triple-layer type liquid crystal display device containing dichroic dyes shown in FIG. 16 comprises capsules of three liquid crystal color layers 56, 57, and 58, and four electrode layers 59, 60, 61, and 62. Each of the liquid crystal color layers 56, 57, and 58 contains dyes of their respective colors in capsules of the liquid crystal materials: the liquid crystal color layers 56, 57, and 58 contain a yellow dye, a cyan dye, and a magenta dye, respectively. A color display is obtained by selectively applying a predetermined voltage to each liquid crystal color layer.

In addition, an example of a color liquid crystal display device using a dichroic dye and color filters is disclosed in, for example, U.S. Pat. No. 4,886,343 and Japanese Laid-Open Patent Application No. 6-202099(1994).

A color liquid crystal display device of U.S. Pat. No. 4,886,343 comprises a layer including two color filters of their respective colors aligned in parallel, a liquid crystal layer containing a dichroic dye, and another liquid crystal layer serving as a shutter. A multi-color display is obtained by selectively using the two color filters of their respective colors.

A color liquid crystal display device of Japanese Laid-Open Patent Application No. 6-202099(1994) comprises a layer including two color filters of their respective colors aligned in parallel, and first and second liquid crystal layers each containing their respective dichroic dyes. The first and second liquid crystal layers, which are sandwiched by a pair of electrodes, have their respective threshold voltages, and a multi-color display is obtained by applying a voltage to these liquid crystal layers dependently. If a common electrode is additionally provided between the first and second liquid crystal layers and voltages are applied to these liquid crystal layers separately, more colors will be available compared with the above case using a single pair of electrodes.

An example of a color display obtained using a color polarizer instead of the color filters is proposed in Japanese Laid-Open Patent Application No. 63-264731(1988). A liquid crystal display of this example is of the double-layer type and a color polarizer is composed of two layers in complementary colors. Here, a color display is obtained by patterning the color polarizer for each pixel in each layer. Thus, a resulting monochrome display is brighter than the one obtained using a single-layer color polarizer; moreover, a black display can be obtained.

However, each of the above-explained prior arts have following problems.

The color liquid crystal display device having the parallel red, green, and blue color filters reduces the intensity of transmitted light to one-third of that of incident light, and thus lowering utilization efficiency of light. Although the liquid crystal display device is advantageous in that it consumes less power, a color display can not be obtained without using a power-consuming back light for this reason, thereby eliminating such an advantage of the liquid crystal display device.

The double-layer type liquid crystal display device, in which one layer contains dichroic dyes complementary to those in the other, displays white, cyan, magenta, and yellow brighter. However, like the above color liquid crystal display device having the parallel red, green, and blue color filters, the intensity of the transmitted light is reduced to one-third of that of the incident light, thereby producing a dark full-color display.

In contrast, the triple-layer type guest-host liquid crystal display device realizes a full-color display using a single pixel. Thus, the utilization of light is highly efficient and a resulting full-color display is sufficiently bright. However, there remains a technical problem that each layer must be driven by individual driving elements which are driven separately. In addition, a thickness of the lamination of the three layers causes undesirable parallax.

The layered type liquid crystal display device comprising the layer having two parallel color filters and the two liquid crystal layers utilizes one-half of the incident light. Thus, the brightness of a resulting color display does increase compared with the case where the red, green, and blue color filters are aligned in parallel, albeit unsatisfactorily.

The example which uses the color filters and two liquid crystal layers fails to realize a full color display, and if it should succeed, a resulting display is dark due to a low utilization efficiency of light.

The liquid crystal display device using the color polarizer uses the polarizing plates and hence reduces the utilization efficiency of the incident light to less than one-half. This type of liquid crystal display device displays intermediate colors darker in a full-color display compared with a monochrome display, and for this reason, is not suitable for a full-color display.

SUMMARY OF THE INVENTION

It is therefore an object of the present invention to provide a liquid crystal display device which can realize a bright multi-color display.

To fulfill the above object, a liquid crystal display device of the present invention is characterized by comprising:
 a filter layer having a set of a cyan color filter, a magenta color filter, a yellow color filter for each pixel, each of said color filters being aligned in parallel with each other;
 a first liquid crystal layer, provided for said color filters, for changing transmittance of light within a first range of wavelengths when an external electric field is applied thereto; and
 a second liquid crystal layer, provided for said color filters, for changing transmittance of light within a second range of wavelength when an external electric field is applied thereto, said first range of wavelengths being different from said second range of wavelengths.

According to the above structure, blue light and green light pass through the cyan color filter while blue light and red light pass through the magenta color filter and green light and red light pass through the yellow color filter. The transmittance characteristics of each filter as above are responsible for a color displayed by each pixel. Here, each filter utilizes two-thirds of incident light, thereby improving the utilization efficiency of light significantly. More specifically, compared with a conventional case where the red, green, and blue color filters are aligned in parallel, the utilization efficiency of light is increased two-fold, and hence making the pixel twice as bright.

The first and second liquid crystal layers change the transmittance of light in different ranges of wavelengths when the external electric fields are applied thereto. Thus, the color of transmitted light from the first and second liquid crystal layers and color filters, and hence the color displayed by each pixel can be changed by controlling the external electric field, which enables a multi-color display.

The above-explained effect can be obtained regardless of the lamination order of the filter layer, and first and second liquid crystal layers. In other words, since these three layers can be laminated in an arbitrary order, the flexibility of a design of the liquid crystal display device can be increased at the time of manufacturing.

When the first and second liquid crystal layers are laminated with the filter layer in between, an active element on an intermediate substrate (substrate in the center) can be omitted. Thus, the intermediate substrate can be made of a thin film member such as a polymeric film. Accordingly, the manufacturing costs can be saved compared with a case where the intermediate substrate is made of glass. Further, using the thin film member such as a polymeric film can make a thinner intermediate substrate. As a result, unsatisfactory display caused by parallax can be reduced, thereby improving the viewing angle characteristics.

As has been explained, the liquid crystal display device of the above structure can realize a brighter multi-color display compared with a conventional liquid crystal display device.

To fulfill the above object, another liquid crystal display device of the present invention is characterized by comprising:
 a first liquid crystal layer for changing transmittance of light within a first range of wavelengths when an external electric field is applied thereto;
 a second liquid crystal layer for changing transmittance of light within a second range of wavelength when an external electric field is applied thereto, said first range of wavelengths being different from said second range of wavelengths; and
 a reflecting layer having a member that reflects cyan light, magenta light, and yellow light of transmitted light from said first and second liquid crystal layers, said member being provided for each pixel.

According to the above structure, the first and second liquid crystal layers change the transmittance of light in different ranges of wavelengths when the external electric fields are applied thereto. Transmitted light from the first and second liquid crystal layers enters into the reflecting layer, and cyan light, magenta light, and yellow light are reflected by the reflecting member provided for each pixel. In other words, two-thirds of incident light can be utilized when the reflecting layer is used. Incident light changes its color as it passes through the first and second liquid crystal layers and reflects off the reflecting layer. Accordingly, the color displayed by each pixel is changed, thereby enabling a multi-color display.

As has been explained, the liquid crystal display device of the above structure can realize a brighter multi-color display compared with a conventional liquid crystal display device.

For a fuller understanding of the nature and advantages of the invention, reference should be made to the ensuing detailed description taken in conjunction with the accompanying drawings.

BRIEF DESCRIPTION OF THE DRAWINGS

FIG. 2(a) shows a case when an intermediate substrate is made of glass; and FIG. 2(b) shows a case when the intermediate substrate is made of a polymeric film serving as a color filter.

EMBODIMENTS

[FIRST EMBODIMENT]

Referring to FIGS. 1 through 5, the following description will discuss an embodiment of the present invention.

Figure 1:
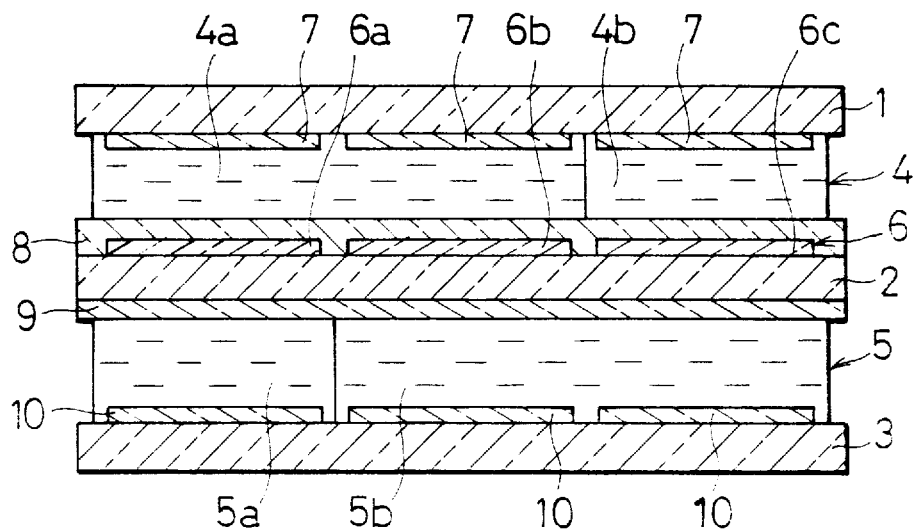
FIG. 1 is a cross sectional view of a liquid crystal display device of the present invention.

As shown in FIG. 1, a liquid crystal display device of the present embodiment includes three transparent substrates 1•2•3 evenly spaced apart, and a liquid crystal layers 4•5 containing their respective dichroic dyes are provided between the transparent substrates 1 and 2 and the transparent substrates 2 and 3, respectively. Pairs of transparent electrodes 7•8 and transparent electrodes 9•10 are provided so as to sandwich the liquid crystal layer 4 and liquid crystal layer 5, respectively. A color filter layer 6 is provided between the transparent substrate 2 and transparent electrode 8.

The color filter layer 6 transmits light in a certain range of wavelengths. Although an external electric field develops each time a voltage is applied across the transparent electrodes 7 and 8 for an image element, the transmittance of the color filter 6 does not change when the external electric field is applied thereto. The color filter layer 6 includes a cyan color filter 6a, a magenta color filter 6b, and a yellow color filter 6c, which are aligned in parallel to each other so as to correspond to three image elements forming a pixel, respectively. The cyan color filter 6a transmits blue (purplish blue) light and green light. The magenta color filter 6b transmits blue (purplish blue) light and red light, and the yellow color filter 6c transmits green light and red light.

Each of the liquid crystal layers 4 and 5 is divided into two areas, and each area contains their respective dichroic dye molecules. For example, the liquid crystal layer 4 is divided into an area 4a made of yellow guest-host liquid crystals and an area 4b made of magenta guest-host liquid crystals. The areas 4a and 4b are provided in such a manner that the former corresponds to the cyan color filter 6a and magenta color filter 6b while the latter to the yellow color filter 6c.

Similarly, the liquid crystal layer 5 is divided into an area 5a made of magenta guest-host liquid crystals and area 5b made of cyan guest-host liquid crystals. The areas 5a and 5b are provided in such a manner that the former corresponds to the cyan color filter 6a, while the latter to the magenta color filter 6b and yellow color filter 6c.

Alternatively, the liquid crystal layer 4 may be divided into a first area made of green guest-host liquid crystals which corresponds to the cyan color filter 6a, and a second area made of red guest-host liquid crystals which corresponds to the magenta color filter 6b and yellow color filter 6c. Also, the liquid crystal layer 5 may be divided into a first area made of blue guest-host liquid crystals which corresponds to the cyan color filter 6a and magenta color filter 6b, and a second area made of green guest-host liquid crystals which corresponds to the yellow color filter 6c.

In all the guest-host liquid crystals in the liquid crystal layers 4•5, a major axis direction of liquid crystal molecules and that of the dichroic dye molecules are substantially parallel to the transparent substrate 1 when no voltage is applied across their respective pairs of electrodes. Accordingly, light in a specific range of wavelengths is absorbed and transmitted light shows a unique color which is determined by the dichroic dye molecules. On the other hand, the major axis direction of the liquid crystal molecules and that of the dichroic dye molecules are substantially orthogonal to the transparent substrate 1 when a voltage is applied across their respective pairs of electrodes, thereby allowing light to pass through the liquid crystal layers 4•5.

Figure 2A:
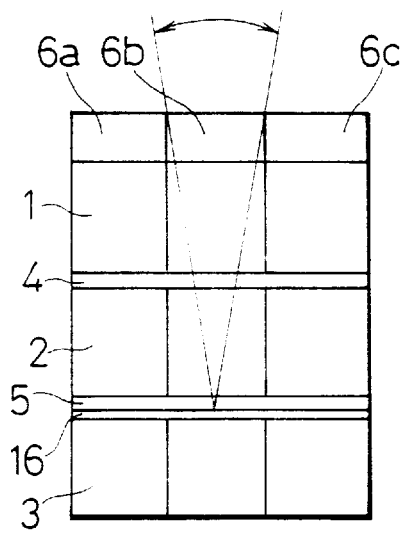
FIGS. 2(a) and 2(b) are views explaining a relation among an order of lamination, viewing angle characteristics, etc.
Figure 2B:
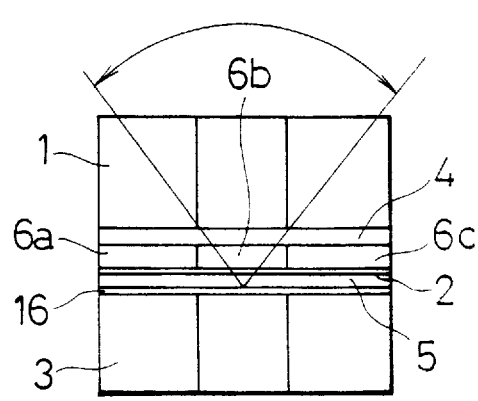

A lamination order of the color filter layer 6, liquid crystal layers 4 and 5 in a vertical direction is arbitrary, and the same effect as to the transmittance of light and displayed color can be obtained in any lamination order. In the following, a relation among the lamination order, viewing angle characteristics, etc. will be explained while referring to FIGS. 2(a) and 2(b). Like components are labeled with like numerals with respect to FIG. 1 and the explanation of these components is omitted for the explanation's convenience. FIG. 2(a) shows a case when an intermediate substrate is made of glass, and FIG. 2(b) shows a case when the intermediate substrate is made of a polymeric film (thin film member) serving as a color filter. Note that the transparent electrodes 7 through 10 of FIG. 1 are omitted in FIGS. 2(a) and 2(b) to explicitly show the position of the layers with respect to each other, and numeral 16 in the drawings denotes a reflecting plate.

In general, two active substrates (substrates on which active elements are formed) shown in FIG. 2(a)) are necessary to drive two liquid crystal layers. To be more specific, it is necessary to form active elements on each of the transparent substrates 2•3 made of glass to drive the liquid crystal layers 4•5 shown in FIG. 2(a). Here, the color filter layer 6 is formed on the transparent substrate 1 of FIG. 2(a) because it is difficult to form the color filter layer 6 and active elements on a single substrate when the convenience of the manufacturing process is considered.

However, the lamination order is arbitrary and the color filter layer 6 may be provided between the liquid crystal layers 4•5 as shown in FIG. 2(b). When the layers are laminated in such an order, the active elements are formed on the transparent substrate 1 and 3, that is to say, the intermediate substrate (the transparent substrate 2) can omit the active elements. This means that the transparent substrate 2 can be made of a polymeric film or the like to save the manufacturing costs. In addition, the intermediate substrate can be thinner if it is made of the polymeric film. Thus, unsatisfactory displays caused by parallax can be reduced, thereby improving the viewing angle characteristics, which is shown in FIGS. 2(a) and 2(b).

Next, an example of a manufacturing method of the above-structured liquid crystal display device will be explained in the following.

Here, 7059 glass substrates (Corning Inc.) of 1.1 mm thick are used as the transparent substrates 1•3, and ITO films, which will serve as the transparent electrodes 7•10, are formed respectively on the glass substrates through sputtering. If the ITO film is too thin, an electrical resistance value becomes excessively large, thereby making it impossible to obtain a uniform display. In contrast, if the ITO film is too thick, not only the transmittance decreases, but also it becomes difficult to etch a fine pattern on the ITO film. In view of the foregoing, it is adequate to form ITO films of 400 Å to 2000 Å thick, and it is preferable to form ITO films of 800 Å to 1500 Å thick. In this embodiment, ITO films of 1000 Å thick are formed.

A relatively thin transparent substrate of 0.7 mm thick is used as the transparent substrate 2 to minimize parallax, and a dyed color filter is formed on a surface of the transparent substrate 2 as the color filter 6. Like those formed on the transparent substrates 1•3, the ITO films, which will serve as the transparent electrodes 8•9, are formed on the two opposing surfaces of the transparent substrate 2 through sputtering.

If the spaces between the transparent substrates are too narrow, light is not absorbed sufficiently besides the fact that it is difficult to assemble the transparent substrates with such narrow spaces, whereas if the spaces are too wide, not only a quite large driving voltage is required but also a response speed decreases. In view of the foregoing, it is adequate to space apart the transparent substrates 1•2 and the transparent substrates 2•3 in a range between 3 $\mu$m and 15 $\mu$m, and it is preferable to space apart the transparent substrates 1•2 and the transparent substrates 2•3 in a range between 4 $\mu$m and 10 $\mu$m. In this embodiment, the transparent substrates 1•2 and the transparent substrates 2•3 are spaced apart 7 $\mu$m using fiber glasses (Nippon Electric Glass Co., Ltd.) as spacers.

Homeotropic films of the liquid crystal layers 4•5 are made of N,N-dimethyl-N-octadecyl-3-aminopropyltrimethoxysilyl chloride. Liquid crystals which serve as the hosts in the liquid crystal layers 4•5 are ZLI-4792 (Merck & Co., Inc.), and a cyan dichroic dye, a magenta dichroic dye, and a yellow dichroic dye which serve as the guests in the liquid crystal layers 4•5 are SI-497 (Mitsui Toatsu Dyes, Inc.), M-618 (Mitsui Toatsu Dyes, Inc.), and M-710 (Mitsui Toatsu Dyes, Inc.), respectively.

If a ratio of a thickness d of the liquid crystal cell to a chiral pitch p, which is expressed by d/p, is too small, a contrast ratio decreases, and if d/p is too large, a driving voltage increases. In view of the foregoing, it is adequate to set d/p in a range between 1 and 5, and it is preferable to set d/p in a range between 1.2 and 2. In this embodiment, d/p is set to 1.7, and the reason why will be explained in the following while referring to FIG. 3.

Figure 3:
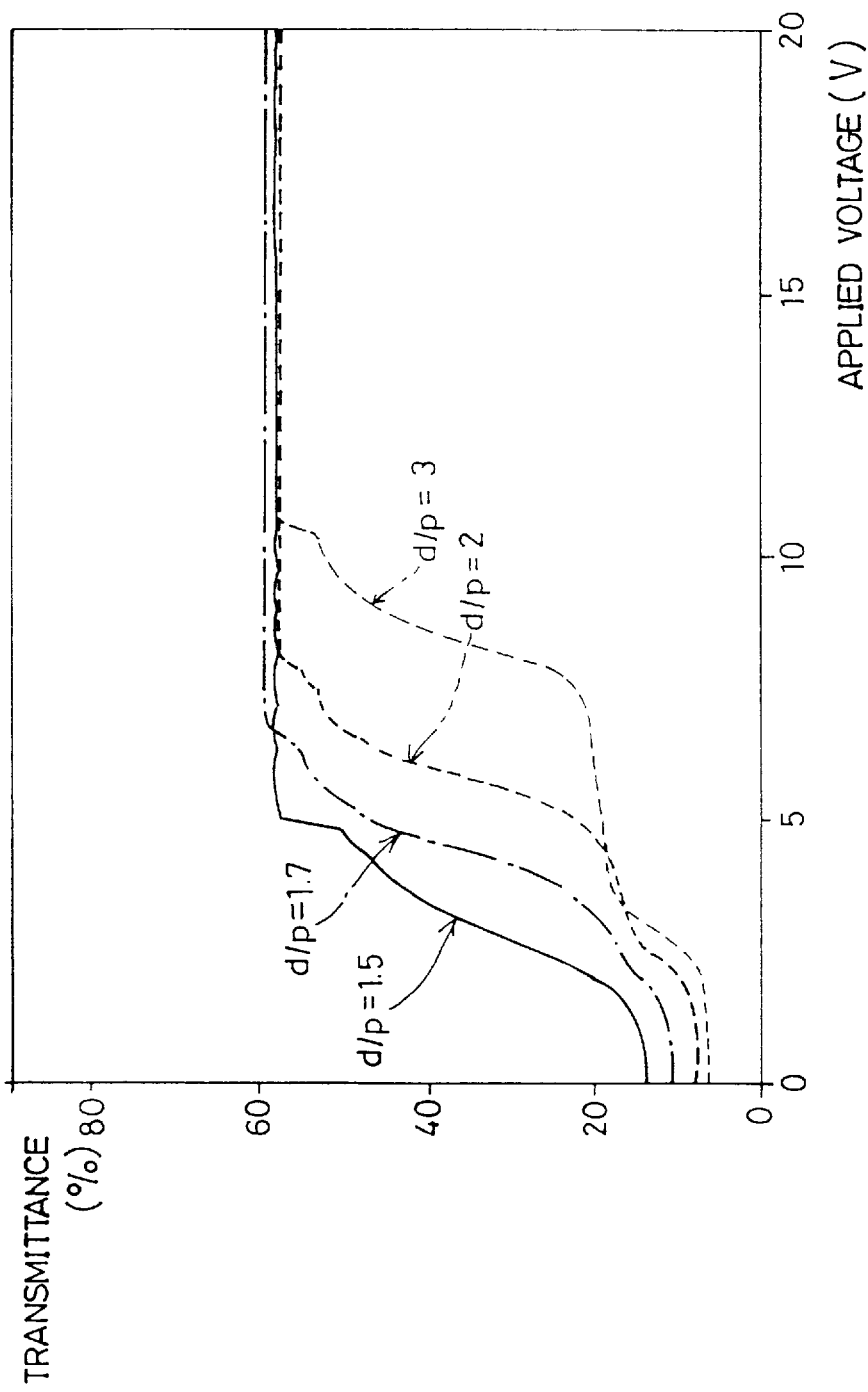
FIG. 3 is a view explaining a dependency of transmittance of the liquid crystal display device to an applied voltage.

As d/p changes, transmittance of light of the liquid crystals changes depending on an applied voltage as shown in FIG. 3. In general, a reflective type liquid crystal display device operates only under the conditions that:

1) a contrast ratio must be not less than 5; and 2) a voltage more than 7 Volts must not be applied to the active elements.

FIG. 3 reveals that an optimal value of d/p satisfying the above requirements is 1.7. This is the reason why d/p is set to 1.7 in this embodiment.

If the density of the dichroic dye is too low, light is not absorbed sufficiently, and in contrast, if the density of the dichroic dye is too high, the dye deposits at a lower temperature. In view of the foregoing, it is adequate to set the density of the dichroic dye in a range between 1 percent by weight and 10 percent by weight, and it is preferable to set the density of the dichroic dye in a range between 2 percent by weight and 5 percent by weight. In this embodiment, the density of the dichroic dye is set to 4 percent by weight and it is found that a corresponding contrast ratio of transmitted light is 5.

Figure 4:
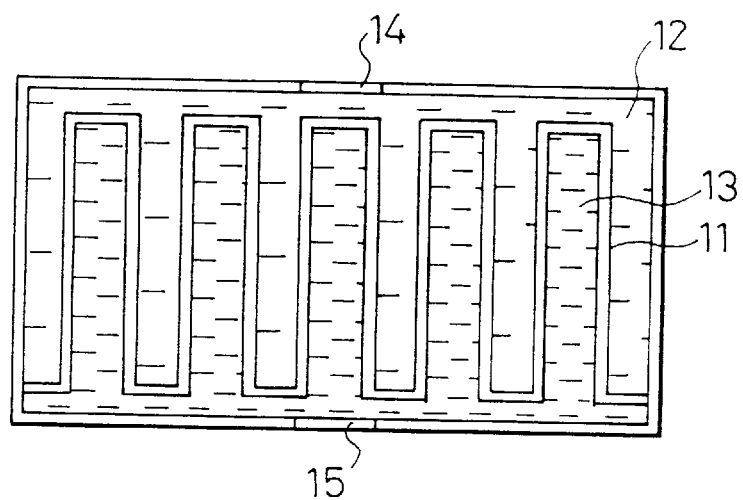
FIG. 4 is a view explaining a method of injecting guest-host liquid crystals of two colors separately.

In this embodiment, the guest-host liquid crystals of two colors are injected separately by the following method. To begin with, adhesive resists OPSR-5600 (Tokyo Ohka Kogyo Co., Ltd.) are applied to each of two glass substrates and the glass substrates are irradiated by ultra-violet rays to erect a comb-shaped wall 11 as shown in FIG. 4. Then, the two glass substrates are laminated to each other and baked. Subsequently, two kinds of liquid crystals 12•13 containing their respective dichroic dyes are injected into the laminated body through liquid crystal injection openings 14•15, respectively.

Projections and depressions may be formed directly on the transparent substrates. For instance, projections in the same shape as the wall 11 of FIG. 4 may be formed on plane transparent substrates by the sol-gel method, or grooves may be etched into the transparent substrates with hydrofluoric acid. Alternatively, the guest-host liquid crystals of two colors may be produced based on a printing method using a micro-capsule technique. Further, the guest-host liquid crystals of two colors may be produced separately by erecting a polymeric wall using a dispenser which is used to apply a seal agent.

Following is an explanation as to how the above-structured liquid crystal display device is driven.

According to the above structure in which the components are layered as shown in FIG. 1 and voltages are applied to the liquid crystal layers 4•5 separately for each image element, an image element corresponding to the cyan color filter 6a, for example, is displayed in different colors in the four following cases:

1) In a case where a voltage is applied to neither of the liquid crystal layers 4•5.

In this case, blue light is absorbed by the area 4a (yellow or green guest-host liquid crystals), and green light having passed through the cyan color filter 6a is absorbed by the area 5a (magenta or blue guest-host liquid crystals). Thus, the image element as a whole is displayed in black.

2) In a case where a predetermined voltage is applied to the liquid crystal layer 4 alone.

In this case, blue light and green light pass through the area 4a (yellow or green guest-host liquid crystals) and the cyan color filter 6a sequentially without being absorbed, and the green light alone is absorbed by the area 5a (magenta or blue guest-host liquid crystals). Thus, the image element as a whole is displayed in blue.

3) In a case where a predetermined voltage is applied to the liquid crystal layer 5 alone.

In this case, blue light is absorbed by the area 4a (yellow or green guest-host liquid crystals), and green light having passed through the cyan color filter 6a also passes through the area 5a (magenta or blue guest-host liquid crystals). Thus, the image element as a whole is displayed in green.

4) In a case where predetermined voltages are applied to the liquid crystal layers 4•5, respectively.

In this case, since no light is absorbed by the areas 4a•5a, the image element is displayed in cyan based on blue light and green light which have passed through the cyan color filter 6a.

Likewise, if the components are layered in the same manner as shown in FIG. 1, an image element corresponding to the magenta color filter 6b is displayed in black, blue, red, and magenta in the above four cases, respectively, and an image element corresponding to the yellow color filter 6c is displayed in black, green, red, and yellow in the above four cases, respectively.

Applications of predetermined voltages to the liquid crystal layers 4•5 for each image element and a resulting color displayed by a pixel are set forth in TABLEs 1 through 8 below. In TABLEs 1 through 8, "ON" indicates that a predetermined voltage is applied to the liquid crystal layers 4•5 for a concerned image element and "OFF" indicates otherwise.

A pixel is displayed in red when the voltages are applied to the liquid crystal layers 4•5 in a combination as set forth in TABLE 1 below. To be more specific, when the voltages are applied in such a combination, the image element corresponding to the cyan color filter 6a alone is displayed in black, while the other image elements corresponding to the magenta color filter 6b and yellow color filter 6c are displayed in red. Thus, the pixel as a whole is displayed in red.

TABLE 1

DISPLAY IN RED

|  | FILTER 6a (CYAN) | FILTER 6b (MAGENTA) | FILTER 6c (YELLOW) |
| --- | --- | --- | --- |
| LIQUID CRYSTAL LAYER 4 | OFF | OFF | OFF |
| LIQUID CRYSTAL LAYER 5 | OFF | ON | ON |
| COLOR OF TRANSMITTED LIGHT | BLACK | RED | RED |

The pixel is displayed in green when the voltages are applied to the liquid crystal layers 4•5 in a combination as set forth in TABLE 2 below. To be more specific, when the voltages are applied in such a combination, the image element corresponding to the magenta color filter 6b alone is displayed in black, while the other image elements corresponding to the cyan color filter 6a and yellow color filter 6c are displayed in green. Thus, the pixel as a whole is displayed in green.

TABLE 2

DISPLAY IN GREEN

|  | FILTER 6a (CYAN) | FILTER 6b (MAGENTA) | FILTER 6c (YELLOW) |
| --- | --- | --- | --- |
| LIQUID CRYSTAL LAYER 4 | OFF | OFF | ON |
| LIQUID CRYSTAL LAYER 5 | ON | OFF | OFF |
| COLOR OF TRANSMITTED LIGHT | GREEN | BLACK | GREEN |

The pixel is displayed in blue when the voltages are applied to the liquid crystal layers 4•5 in a combination as set forth in TABLE 3 below. To be more specific, when the voltages are applied in such a combination, the image element corresponding to the yellow color filter 6c alone is displayed in black, while the other image elements corresponding to the cyan color filter 6a and magenta color filter 6b are displayed in blue. Thus, the pixel as a whole is displayed in blue.

TABLE 3

DISPLAY IN BLUE

|  | FILTER 6a (CYAN) | FILTER 6b (MAGENTA) | FILTER 6c (YELLOW) |
| --- | --- | --- | --- |
| LIQUID CRYSTAL LAYER 4 | ON | ON | OFF |
| LIQUID CRYSTAL LAYER 5 | OFF | OFF | OFF |
| COLOR OF TRANSMITTED LIGHT | BLUE | BLUE | BLACK |

The pixel is displayed in cyan when the voltages are applied to the liquid crystal layers 4•5 in a combination as set forth in TABLE 4 below. To be more specific, when the voltages are applied in such a combination, the image element corresponding to the cyan color filter 6a is displayed in cyan, and the image element corresponding to the magenta color filter 6b and the one corresponding to the yellow color filter 6c are displayed in blue and green, respectively. Since the additive mixture of blue light and green light is cyan light, this is equivalent to a case where two image elements out of three are displayed in cyan. Thus, the pixel as a whole is displayed in cyan.

TABLE 4

DISPLAY IN CYAN

|  | FILTER 6a (CYAN) | FILTER 6b (MAGENTA) | FILTER 6c (YELLOW) |
|---|---|---|---|
| LIQUID CRYSTAL LAYER 4 | ON | ON | ON |
| LIQUID CRYSTAL LAYER 5 | ON | OFF | OFF |
| COLOR OF TRANSMITTED LIGHT | CYAN | BLUE | GREEN |

The pixel is displayed in magenta when the voltages are applied to the liquid crystal layers 4•5 in a combination as set forth in TABLE 5 below. To be more specific, when the voltages are applied in such a combination, the image element corresponding to the cyan color filter 6a is displayed in blue, and the image element corresponding to the magenta color filter 6b and the one corresponding to the yellow color filter 6c are displayed in magenta and red, respectively. Since the additive mixture of blue light and red light is magenta light, this is equivalent to a case where two image elements out of three are displayed in magenta. Thus, the pixel as a whole is displayed in magenta.

TABLE 5

DISPLAY IN MAGENTA

|  | FILTER 6a (CYAN) | FILTER 6b (MAGENTA) | FILTER 6c (YELLOW) |
|---|---|---|---|
| LIQUID CRYSTAL LAYER 4 | ON | ON | OFF |
| LIQUID CRYSTAL LAYER 5 | OFF | ON | ON |
| COLOR OF TRANSMITTED LIGHT | BLUE | MAGENTA | RED |

The pixel is displayed in yellow when the voltages are applied to the liquid crystal layers 4•5 in a combination as set forth in TABLE 6 below. To be more specific, when the voltages are applied in such a combination, the image element corresponding to the cyan color filter 6a is displayed in green, and the image element corresponding to the magenta color filter 6b and the one corresponding to the yellow color filter 6c are displayed in red and yellow, respectively. Since additive mixture of green light and red light is yellow light, this is equivalent to a case where two image elements out of three are displayed in yellow. Thus, the pixel as a whole is displayed in yellow.

TABLE 6

DISPLAY IN YELLOW

|  | FILTER 6a (CYAN) | FILTER 6b (MAGENTA) | FILTER 6c (YELLOW) |
|---|---|---|---|
| LIQUID CRYSTAL LAYER 4 | OFF | OFF | ON |
| LIQUID CRYSTAL LAYER 5 | ON | ON | ON |
| COLOR OF TRANSMITTED LIGHT | GREEN | RED | YELLOW |

The pixel is displayed in black when a voltage is applied to neither the liquid crystal layer 4 nor liquid crystal layer 5, so that all the image elements are displayed in black as set forth in TABLE 7.

TABLE 7

DISPLAY IN BLACK

|  | FILTER 6a (CYAN) | FILTER 6b (MAGENTA) | FILTER 6c (YELLOW) |
|---|---|---|---|
| LIQUID CRYSTAL LAYER 4 | OFF | OFF | OFF |
| LIQUID CRYSTAL LAYER 5 | OFF | OFF | OFF |
| COLOR OF TRANSMITTED LIGHT | BLACK | BLACK | BLACK |

The pixel is displayed in white through the additive mixture process when predetermined voltages are applied to both the liquid crystal layer 4 and liquid crystal layer 5 for each image element, and the image elements are displayed respectively in cyan, magenta, and yellow as set forth in TABLE 8 below.

TABLE 8

DISPLAY IN WHITE

|  | FILTER 6a (CYAN) | FILTER 6b (MAGENTA) | FILTER 6c (YELLOW) |
|---|---|---|---|
| LIQUID CRYSTAL LAYER 4 | ON | ON | ON |
| LIQUID CRYSTAL LAYER 5 | ON | ON | ON |
| COLOR OF TRANSMITTED LIGHT | CYAN | MAGENTA | YELLOW |

As shown in TABLEs 1 through 6, two primary colors out of three pass through each color filter, and two image elements out of three are displayed in the same color. Thus, a full-color liquid crystal element of the present embodiment can double both the utilization efficiency of incident light and the brightness compared with a case where the conventional red, blue, and green filters are used.

Figure 5:
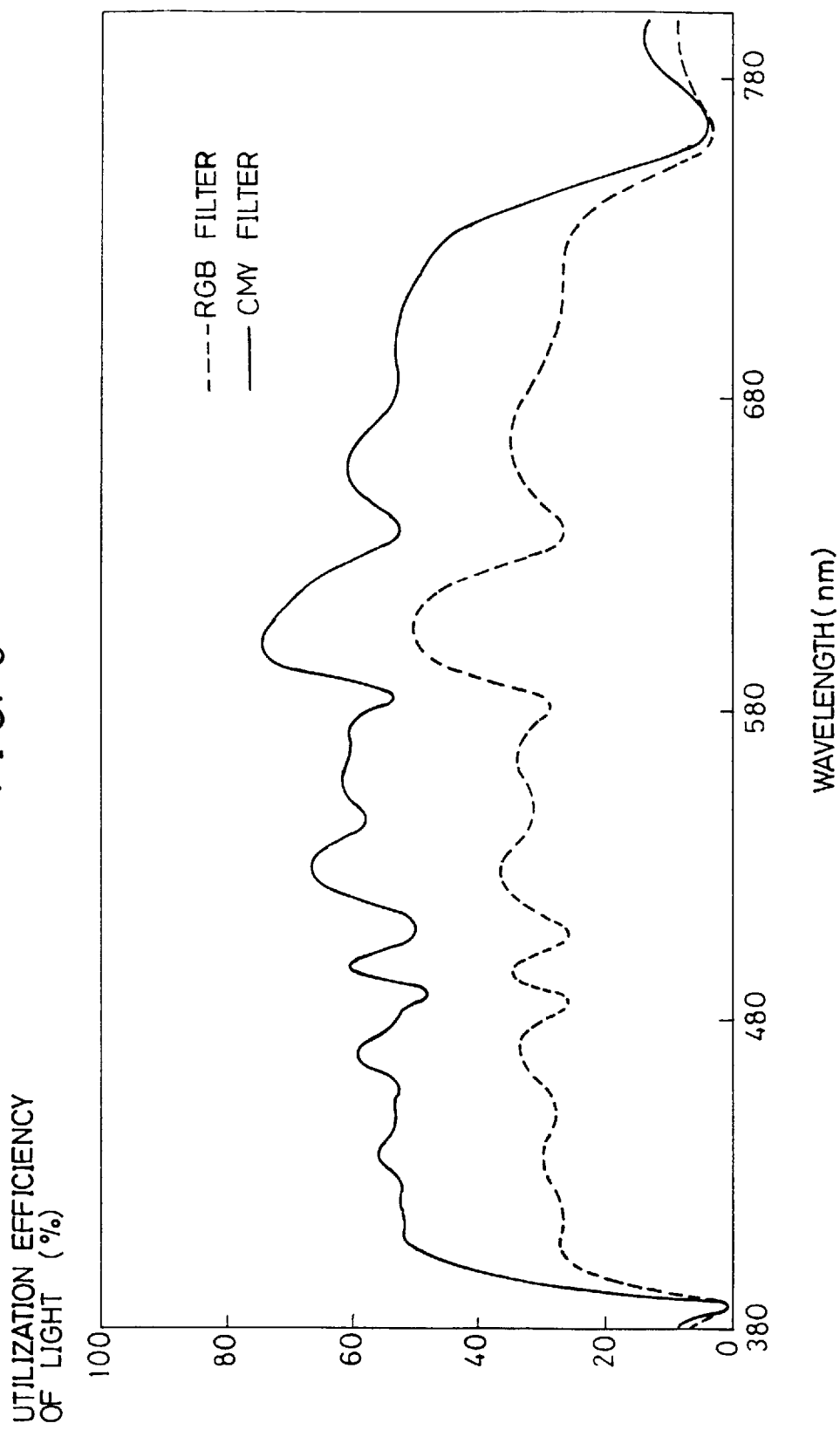
FIG. 5 is a view explaining a comparison between a CMY (cyan, magenta, and yellow) color filter, and a conventional RGB (red, green, and blue) filter in terms of utilization efficiency of light.

The transmission type liquid crystal display device of the present embodiment using the CMY (cyan, magenta, and yellow) filter and a conventional liquid crystal display device using RGB (red, green, and blue) filter are compared in terms of the dependency of the utilization efficiency on the incident light's wavelengths when the pixel is displayed in white, and the result of which is shown in FIG. 5. As shown in FIG. 5, the utilization efficiency (brightness) of light in the liquid crystal display device of the present embodiment is increased about two-fold compared with the conventional liquid crystal display device. In addition, the brightness is increased two-fold without impairing the purity of each color when the pixels are displayed individually in red, green, blue, cyan, magenta, yellow, and white.

The lamination order within the image elements in a vertical direction is arbitrary in this embodiment. Thus, when the guest-host liquid crystals are a combination of cyan, magenta, and yellow, or a combination of red, green, and yellow, the liquid crystal display device can be of a simple structure having the guest-host liquid crystals of two colors in each layer as shown in FIG. 1.

In this embodiment, the liquid crystal layers 4•5 transmit light of different ranges of wavelengths, and voltages are applied to the liquid crystal layers 4•5 separately. Thus, the liquid crystal layers 4•5 can be made relatively easy using a comb-shaped cell, and a resulting display is fairy bright.

A case where the voltages are applied to the liquid crystal layers 4•5 separately for each image element was explained in the present embodiment. However, the present invention is not limited to the above case, and the voltages may be applied to the liquid crystal layers 4•5 simultaneously for each image element if the liquid crystal layer 4 is laminated adjacently to the liquid crystal layer 5. This structure can be realized by providing a pair of electrodes which sandwich the liquid crystal layers 4•5 and applies voltages simultaneously to the liquid crystal layers 4•5 to change the transmittance of each layer in response to the magnitudes of the applied voltages. When the voltages are applied to the liquid crystal layers 4•5 simultaneously for each image element, a simple, bright, multi-color liquid crystal display device can be realized, although the number of available colors is reduced.

In the present embodiment, the guest-host mode of the White-Taylor type with the homeotropic surface treatment was explained. However, the present invention is not limited to this specific mode, and a White-Taylor mode with the homogeneous surface treatment, or other guest-host modes may be used as well. Alternatively, polymer dispersing type liquid crystal display device such as a PDLC may be used.

In the present embodiment, the color filter layer 6 is formed on the transparent substrate 2. However, the present invention is not limited to this specific structure, and the color filter layer 6 can be laminated in any order within one image element; the color filter layer 6 may be formed on a lower surface of the transparent substrate 1 or transparent substrate 2, or on an upper surface of the transparent substrate 3. Note that the function and effect of the color filter layer 6 are the same in any lamination order. In addition, the transparent substrate 2 can be replaced with a color filter layer.

In the present embodiment, a dyed color filter was used as the color filter. However, the color filter is not limited to the dyed color filter, and a dye distributed filter or printed color filter may be used. Alternatively, a liquid crystal layer which shows cyan, magenta, and yellow may be used as the color filer layer.

In the present embodiment, a transmission type liquid crystal display device was explained as an example, but the present invention is not limited to the transmission type liquid crystal display device. The present invention can be applied to a reflective type liquid crystal display device if a reflecting plate is additionally provided. In this case, incident light on the reflecting plate, which is in effect the transmitted light from the color filter layer 6 and liquid crystal layers 4•5, is reflected by the reflecting plate, and enters into the color filter layer 6 to pass through the color filters other than the one it has already passed through, thereby making it possible to further improve the utilization efficiency of light. Also, for example, if a reflecting electrode (not shown) made of Al is formed on the transparent substrate 3, the reflecting electrode can also serve as the reflecting plate, which is known as an inter-cell reflecting electrode structure.

[SECOND EMBODIMENT]

Figure 6:
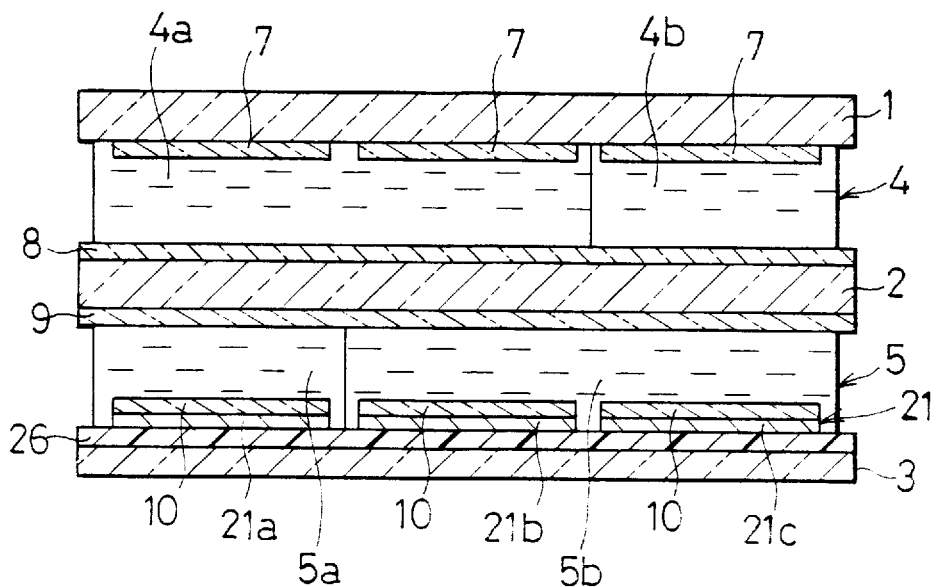
FIG. 6 is a cross sectional view of another liquid crystal display device of the present invention.
Figure 7:
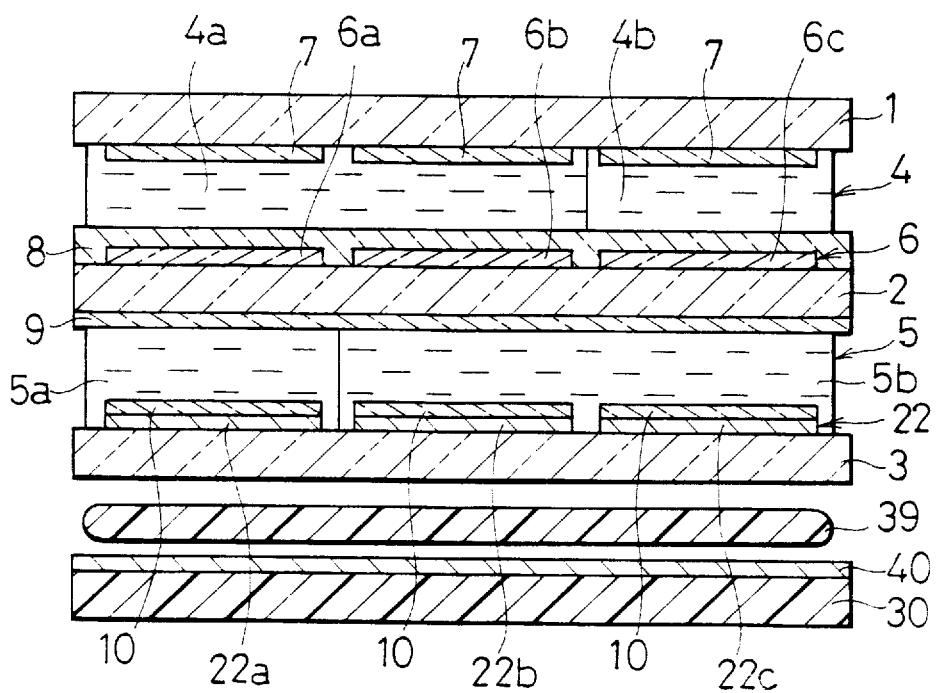
FIG. 7 is a cross sectional view of a further liquid crystal display device of the present invention.

Referring to FIGS. 6 and 7, the following description will discuss another embodiment of the present invention. Like components are labelled with like numerals with respect to the first embodiment and the explanation of these components is not repeated for the explanation's convenience.

A liquid crystal display device of the present embodiment is of a reflective type, and as shown in FIG. 6, the reflective type liquid crystal display device is different from the transmission type liquid crystal display device of the first embodiment in that: a dielectric mirror layer 21 which reflects cyan light, magenta light, and yellow light is provided on a lower surface of the transparent electrode 10 instead of the color filter layer 6 which transmits cyan light, magenta light, and yellow light; and a photo-absorbing layer 26 which absorbs incident light is provided between the dielectric mirror layer 21 and transparent substrate 3. The dielectric mirror layer 21 comprises a dielectric mirrors 21a, 21b, and 21c which correspond to three image elements in one pixel, respectively and reflect cyan light, magenta light, and yellow light, respectively.

The dielectric mirrors 21a•21b•21c of the dielectric mirror layer 21 are made of a lamination of an $SiO_2$ layer having a refractive index of about 1.46 and a $TiO_2$ layer having a refractive index of about 2.1. Each of the $SiO_2$ layer and $TiO_2$ layer satisfies a relation as follows:

$$n \cdot d = \lambda/4$$

where n is the refractive index of each layer, d is a thickness of each layer, and λ is a wavelength of light reflected by each mirror.

According to the above structure, if cyan light enters the dielectric mirror 21a when the voltages are applied to both the liquid crystal layers 4•5, the cyan light is reflected toward the liquid crystal layers 4•5 again. On the other hand, red light passes through the dielectric mirror 21a and enters the photo-absorbing layer 26 to be absorbed therein. The rest of the operation is identical with the first embodiment except that the order of the liquid crystal layers 4•5 is reversed, and the explanation thereof is omitted herein. Since the dielectric mirror layer 21 per se serves as the reflecting plate, the reflecting type liquid crystal display device of the present embodiment can be of a simpler structure compared with a case where a liquid crystal display device structured as shown in FIG. 1 is changed into the reflective type by additionally providing a reflecting plate.

Also, each image element, and hence a pixel is displayed in a specific color under the predetermined state of the liquid crystal layers 4•5 (i.e., whether they are turned on or not) in the same manner as the first embodiment, and the explanation thereof is omitted.

In the following, a transmission type liquid crystal display device using a dielectric mirror will be explained while referring to FIG. 7. Like components are labelled with like numerals with respect to FIGS. 1 and 6, and the explanation of these components is not repeated.

The transmission type liquid crystal display device of FIG. 7 is different from its counterpart of the first embodiment in that:

1) a dielectric mirror layer 22 comprising dielectric mirrors 22a, 22b, and 22c which respectively reflect red light, green light, and blue light for three image elements in one pixel is provided on a lower surface of the transparent substrate 10;

2) a back light 39 is provided below the transparent substrate 3; and 3) a substrate 30 having a mirror 40 on the top surface thereof is provided below the back light 39.

According to the above structure, cyan light, magenta light, and yellow light pass through the dielectric mirrors 22a, 22b, and 22c, respectively, and thus forming a transmission type liquid crystal display device. However, since the dielectric mirror layer 22 reflects external light, the cyan color filter 6a, magenta color filter 6b, and yellow color filter 6c must be provided above the dielectric mirrors 22a•22b•22c reflecting red, green, and blue light, respectively. In this case, therefore, the structure becomes complicated; however, since light coming out from the back light 39 and reflected by the dielectric mirror layer 22 is reflected again by the mirror 40 provided below the back light 39 and passes through the dielectric mirror of another image element, thereby further enhancing the utilization efficiency of light.

If one layer is to contain liquid crystals of two respective colors, such a layer can be produced in the same manner as the first embodiment, and the explanation thereof is omitted herein.

Only the basic structure was explained in the first and second embodiments, but in practice, it is preferable to provide a thin film transistor or two-terminal element such as an MIM (metal-insulator metal) element and a varistor on the transparent substrates 1•3 when assembling a liquid crystal panel to display an image or the like. In the first and second embodiments, a glass plate of 0.7 mm thick was used as the transparent substrate provided between the two liquid crystal layers; however, if the parallax is taken into consideration, it is preferable to use a glass substrate of 0.3 mm to 0.7 mm thick. Further, a polymeric film substrate or the like can be used as the transparent substrate. The parallax can be eliminated completely when a fiber plate, SELFOC lens, micro-lens, or the like is used on the transparent substrate.

[THIRD EMBODIMENT]

Figure 8:
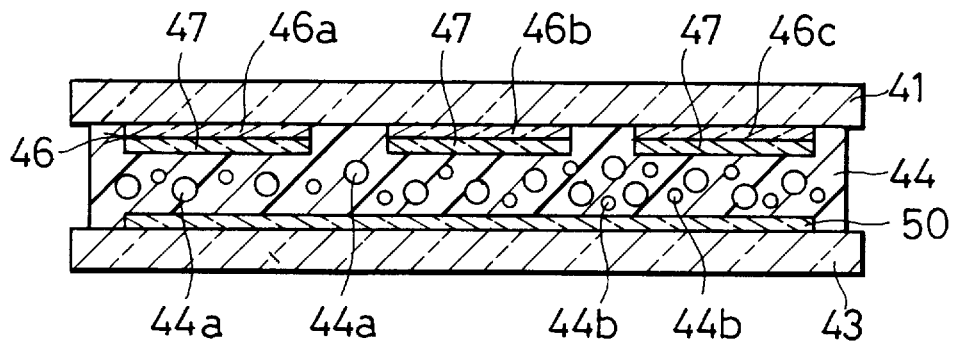
FIG. 8 is a cross sectional view of still another liquid crystal display device of the present invention.

As shown in FIG. 8, a liquid crystal display device of the present embodiment includes a liquid crystal layer 44 containing dichroic dye molecules between transparent substrates 41•43. A color filter 46 is provided between the transparent substrate 41 and a transparent electrode 47 as a layer for transmitting or reflecting light in a certain range of wavelengths. As shown in the drawing, the color filter 46 includes a cyan color filter 46a, a magenta color filter 46b, and a yellow color filter 46c, each corresponding to one image element. The liquid crystal layer 44 includes droplets 44a•44b of different sizes, which are made of liquid crystals and contain their respective dichroic dyes. The larger droplets 44a contain a cyan dichroic dye while the smaller droplets 44b contain a red dichroic dye.

According to the present embodiment, two kinds of droplets 44a•44b containing the liquid crystals are included in a single liquid crystal layer 44. Thus, unlike the first and second embodiments, it is not necessary to separate the liquid crystals within the layer, thereby making it possible to slush the steps in the manufacturing process.

A size of the droplets depends on a threshold of a voltage driving the liquid crystals (a voltage applied across the transparent electrodes 47 and 50). The liquid crystals within the larger droplets 44a are driven by a low voltage, and the liquid crystals within the smaller droplets 44b are driven when the voltage is increased. Accordingly, although the cyan color filter 46a displays only black and cyan, the magenta color filter 46b can display black, blue, and magenta while the yellow color filter 46c can display black, green, and yellow.

As has been explained, the liquid crystal display device of the present embodiment is of a simple structure using a single liquid crystal layer 44. Thus, the number of elements controlling the drive of the liquid crystal layer can be reduced significantly compared with a case where two liquid crystal layers are used. Also, the present embodiment realizes a multi-color display device which can display white by utilizing two-thirds of incident light.

A combination of colors of the droplets 44a and 44b is not limited to the one specified as above, and any combination of complementary colors is available. Also, one liquid crystal layer does not necessarily contain two kinds of droplets, and two liquid crystal layers each containing their respective kinds of droplets may be laminated to each other. In this case, however, the structure complicates and the number of the elements controlling the liquid crystal layers increases.

In this embodiment, the droplets 44a•44b of different sizes were used, so that the droplets 44a•44b will have their respective thresholds, but the present invention is not limited to this structure. The liquid crystal display device may be of double-layer structure in which each layer contains liquid crystals having different thresholds.

To explain the simplest structure, the liquid crystals of the present embodiment show the same color regardless of the colors of the color filters. However, liquid crystals which show different colors depending on the colors of the color filters may be used. For example, if a combination of cyan, magenta, and yellow color filters are layered like the first and second embodiments, more colors will be available.

Also, like the second embodiment, the liquid crystal display device of the present embodiment can be changed to a reflective type or transmission type which uses a dielectric mirror.

[FOURTH EMBODIMENT]

Figure 9:
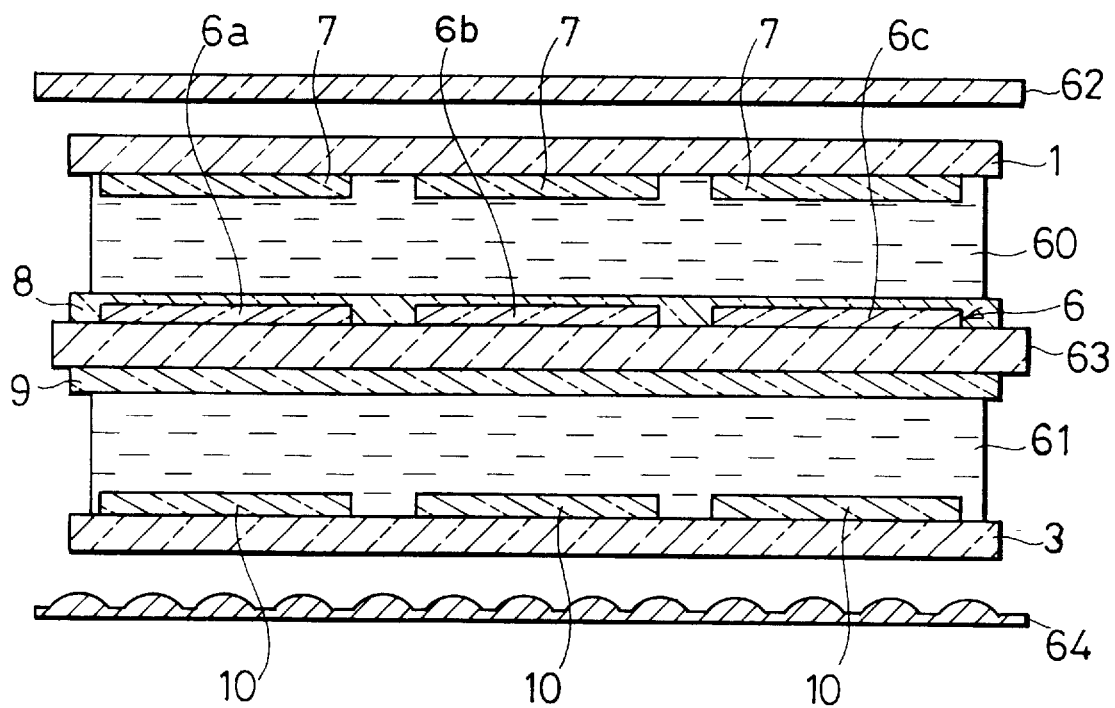
FIG. 9 is a cross sectional view of still another liquid crystal display device of the present invention.
Figure 10:
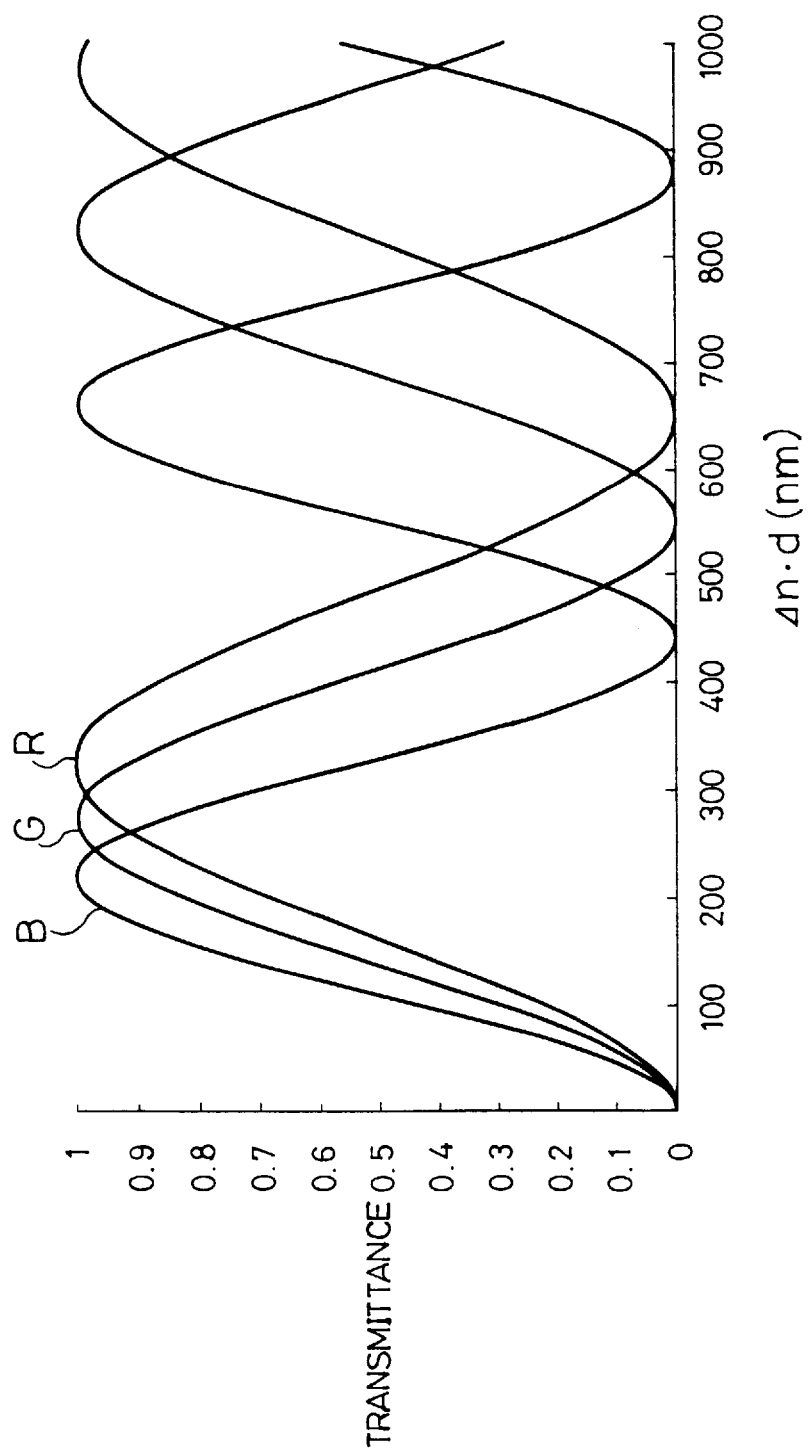
FIG. 10 is a graph showing a retardation-transmittance curve in each wavelength with the above liquid crystal display device.

Referring to FIGS. 5, 9, and 10, the following description will discuss still another embodiment of the present invention. Like components are labelled with like numerals with respect to the first embodiment and the explanation of these components is not repeated for the explanation's convenience.

Unlike the counterpart of the first embodiment which enables multi-color display using dichroic dyes in the liquid crystal layers 4•5, a liquid crystal display device of the present embodiment displays colors by exploiting a birefringence effect. In such a liquid crystal display device, the liquid crystal layers are sandwiched by a pair of polarizing plates to render the transmitted light various colors as a result of an interference effect between an ordinary wave and an extraordinary wave.

The liquid crystal display device of the present embodiment shown in FIG. 9 is of a reflecting type, and compared with the counterpart of the first embodiment, a substrate 63 having a linear polarizability is provided instead of the transparent substrate 2, a liquid crystal layer 60 made of homogeneous nematic liquid crystal layers is provided between the transparent substrates 1 and 63 instead of the liquid crystal layer 4, and a liquid crystal layer 60 made of homogeneous nematic liquid crystals is provided between the transparent substrates 63 and 3 instead of the liquid crystal layer 5. Further, a linear polarizing plate 62 is placed on an outer surface side (upper side in the drawing) of the transparent substrate 1, while a reflecting plate 64 is placed on an outer surface side (lower side in the drawing) of the transparent substrate 3. A plain transparent substrate and a liner polarizing plate may be combined to serve as the transparent substrate 63 having the liner polarizability.

The initial alignment directions of the liquid crystal layers 60•61 are controlled by the rubbing method so that they match. The polarizing axis of the linear polarizing plate 62 is set to 45° with respect to the initial alignment direction, and the polarizing axis of the transparent substrate 63 having the linear polarizability is set to −45° with respect to the initial alignment direction, assuming that a direction in which the rubbing method was applied is 0° and a clockwise direction is positive.

According to the above structure, the liquid crystal layers 60•61 show interference colors due to birefringence interference, and the interference colors can be changed by changing the retardation (Δn•d) of the liquid crystals using the voltages applied from pairs of the transparent electrodes 7•8 and 9•10.

In other words, an applied voltage is controlled in such a manner that areas corresponding to the cyan color filter 6a and magenta color filter 6b in the liquid crystal layer 60 will show white-yellow, and another applied voltage is controlled in such a manner that an area corresponding to the yellow color filter 6c in the liquid crystal layer 60 will show white-magenta.

Likewise, an applied voltage is controlled in such a manner that an area corresponding to the cyan color filter 6a in the liquid crystal layer 61 will show white-magenta, and another applied voltage is controlled in such a manner that areas corresponding to the magenta color filter 6b and yellow color filter 6c in the liquid crystal layer 61 will show white-cyan.

Since the colors shown by the liquid crystal layers 60•61 are determined by the retardation (Δn•d) of the liquid crystals as shown in FIG. 10, the voltages applied to the liquid crystal layers 60•61 are controlled in such a manner that the liquid crystals will have a retardation (Δn•d) corresponding to a desired color. To be more specific, to display a desired color, voltages are applied to the liquid crystal layers 60•61, so that the retardation of the liquid crystals will be in a range specified as follows:

| DESIRED COLOR | RETARDATION |
|---|---|
| White | 100 nm to 200 nm |
| Yellow | 250 nm to 350 nm |
| Magenta | 450 nm to 550 nm |
| Cyan | 650 nm to 750 nm |

In the following, the colors displayed by the liquid crystal layers 60•61 for each image element and a resulting color displayed by a pixel are set forth in TABLEs 9 through 16 below.

A pixel is displayed red when the applied voltages to the liquid crystal layers 60•61 are controlled in such a manner that the liquid crystals have a combination of retardation for the interference colors as set forth in TABLE 9 below. To be more specific, the image element corresponding to the cyan color filter 6a alone is displayed in black, while the image elements corresponding to the magenta color filer 6b and yellow color filter 6c are displayed in red. Thus, the pixel as a whole is displayed in red.

TABLE 9

| | DISPLAY IN RED | | |
|---|---|---|---|
| | FILTER 6a (CYAN) | FILTER 6b (MAGENTA) | FILTER 6c (YELLOW) |
| LIQUID CRYSTAL LAYER 60 | YELLOW | YELLOW | MAGENTA |
| LIQUID CRYSTAL LAYER 61 | MAGENTA | WHITE | WHITE |
| COLOR OF TRANSMITTED LIGHT | BLACK | RED | RED |

The pixel is displayed in green when the applied voltages to the liquid crystal layers 60•61 are controlled in such a manner that the liquid crystals have a combination of retardation for the interference colors as set forth in TABLE 10 below. To be more specific, the image element corresponding to the magenta color filter 6b alone is displayed in black, while the other two image elements corresponding to the cyan color filer 6a and yellow color filter 6c are displayed in green. Thus, the pixel as a whole is displayed in green.

TABLE 10

| | DISPLAY IN GREEN | | |
|---|---|---|---|
| | FILTER 6a (CYAN) | FILTER 6b (MAGENTA) | FILTER 6c (YELLOW) |
| LIQUID CRYSTAL LAYER 60 | YELLOW | YELLOW | WHITE |
| LIQUID CRYSTAL LAYER 61 | WHITE | CYAN | CYAN |
| COLOR OF TRANSMITTED LIGHT | GREEN | BLACK | GREEN |

The pixel is displayed in blue when the applied voltages to the liquid crystal layers 60•61 are controlled in such a manner that the liquid crystals have a combination of retardation for the interference colors as set forth in TABLE 11 below. To be more specific, the image element corresponding to the yellow color filter 6c alone is displayed in black, while the other two image elements corresponding to the cyan color filer 6a and magenta color filter 6b are displayed in blue. Thus, the pixel as a whole is displayed in blue.

TABLE 11

| | DISPLAY IN BLUE | | |
|---|---|---|---|
| | FILTER 6a (CYAN) | FILTER 6b (MAGENTA) | FILTER 6c (YELLOW) |
| LIQUID CRYSTAL LAYER 60 | WHITE | WHITE | MAGENTA |
| LIQUID | MAGENTA | CYAN | CYAN |

TABLE 11-continued

DISPLAY IN BLUE

|  | FILTER 6a (CYAN) | FILTER 6b (MAGENTA) | FILTER 6c (YELLOW) |
|---|---|---|---|
| CRYSTAL LAYER 61 |  |  |  |
| COLOR OF TRANSMITTED LIGHT | BLUE | BLUE | BLACK |

The pixel is displayed in cyan when the applied voltages to the liquid crystal layers 60•61 are controlled in such a manner that the liquid crystals have a combination of retardation for the interference colors as set forth in TABLE 12 below. To be more specific, the image elements corresponding to the cyan color filter 6a, magenta color filter 6b, and yellow color filter 6c are displayed in cyan, blue, and green, respectively. Since the additive mixture of blue light and green light is cyan light, this is equivalent to a case where two image elements out of three are displayed in cyan. Thus, the pixel as a whole is displayed in cyan.

TABLE 12

DISPLAY IN CYAN

|  | FILTER 6a (CYAN) | FILTER 6b (MAGENTA) | FILTER 6c (YELLOW) |
|---|---|---|---|
| LIQUID CRYSTAL LAYER 60 | WHITE | WHITE | WHITE |
| LIQUID CRYSTAL LAYER 61 | WHITE | CYAN | CYAN |
| COLOR OF TRANSMITTED LIGHT | CYAN | BLUE | GREEN |

A pixel displays magenta when the applied voltages to the liquid crystal layers 60•61 are controlled in such a manner that the liquid crystals have a combination of retardation for the interference colors as set forth in TABLE 13 below. To be more specific, the image elements corresponding to the cyan color filter 6a, magenta color filter 6b, and yellow color filter 6c are displayed in blue, magenta, and red, respectively. Since the additive mixture of blue light and red light is magenta light, this is equivalent to a case where two image elements out of three are displayed in magenta. Thus, the pixel as a whole is displayed in magenta.

TABLE 13

DISPLAY IN MAGENTA

|  | FILTER 6a (CYAN) | FILTER 6b (MAGENTA) | FILTER 6c (YELLOW) |
|---|---|---|---|
| LIQUID CRYSTAL LAYER 60 | WHITE | WHITE | MAGENTA |
| LIQUID CRYSTAL LAYER 61 | MAGENTA | WHITE | WHITE |
| COLOR OF TRANSMITTED LIGHT | BLUE | MAGENTA | RED |

The pixel is displayed in yellow when the applied voltages to the liquid crystal layers 60•61 are controlled in such a manner that the liquid crystals have a combination of retardation for the interference colors as set forth in TABLE 14 below. To be more specific, the image elements corresponding to the cyan color filter 6a, magenta color filter 6b, and yellow color filter 6c are displayed in green, red, and yellow, respectively. Since the additive mixture of green light and red light is yellow light, this is equivalent to a case where two image elements out of three will be displayed in yellow. Thus, the pixel as a whole is displayed in yellow.

TABLE 14

DISPLAY IN YELLOW

|  | FILTER 6a (CYAN) | FILTER 6b (MAGENTA) | FILTER 6c (YELLOW) |
|---|---|---|---|
| LIQUID CRYSTAL LAYER 60 | YELLOW | YELLOW | WHITE |
| LIQUID CRYSTAL LAYER 61 | WHITE | WHITE | WHITE |
| COLOR OF TRANSMITTED LIGHT | GREEN | RED | YELLOW |

The pixel is displayed in black when the applied voltages to the liquid crystal layers 60•61 are controlled in such a manner that the liquid crystals have a combination of retardation for the interference colors as set forth in TABLE 15 below. To be more specific, the image elements corresponding to the cyan color filter 6a, magenta color filter 6b, and yellow color filter 6c are all displayed in black.

TABLE 15

DISPLAY IN BLACK

|  | FILTER 6a (CYAN) | FILTER 6b (MAGENTA) | FILTER 6c (YELLOW) |
|---|---|---|---|
| LIQUID CRYSTAL LAYER 60 | YELLOW | YELLOW | MAGENTA |
| LIQUID CRYSTAL LAYER 61 | MAGENTA | CYAN | CYAN |
| COLOR OF TRANSMITTED LIGHT | BLACK | BLACK | BLACK |

The pixel is displayed in white when the applied voltages to the liquid crystal layers 60•61 are controlled in such a manner that the liquid crystals have a combination of retardation for the interference colors as set forth in TABLE 16 below. To be more specific, the image elements corresponding to the cyan color filter 6a, magenta color filter 6b, and yellow color filter 6c are displayed in cyan, magenta, yellow, respectively, which turn into white when additively mixed.

TABLE 16

DISPLAY IN WHITE

|  | FILTER 6a (CYAN) | FILTER 6b (MAGENTA) | FILTER 6c (YELLOW) |
|---|---|---|---|
| LIQUID CRYSTAL LAYER 60 | WHITE | WHITE | WHITE |

TABLE 16-continued

| | DISPLAY IN WHITE | | |
|---|---|---|---|
| | FILTER 6a (CYAN) | FILTER 6b (MAGENTA) | FILTER 6c (YELLOW) |
| LIQUID CRYSTAL LAYER 61 | WHITE | WHITE | WHITE |
| COLOR OF TRANSMITTED LIGHT | CYAN | MAGENTA | YELLOW |

As shown in TABLEs 9 through 14, two primary colors out of three pass through each color filter, and two image elements out of three are displayed in the same color. Thus, like the first embodiment, a full-color liquid crystal display device of the present embodiment can double not only the utilization efficiency of incident light but also the brightness compared with a case where the conventional red, blue, and green filters are used.

The transmission type liquid crystal display device of the present embodiment using the CMY filter and a conventional liquid crystal display device using RGB filter are compared in terms of the dependency of the utilization efficiency of light on the incident light's wavelength when the pixel is displayed in white, and the result of which is shown in FIG. 5. As shown in FIG. 5, the utilization efficiency of light (brightness) in the liquid crystal display device of the present embodiment is increased two-fold compared with the conventional liquid crystal display device as was in the first embodiment.

In addition, the brightness is increased two-fold without impairing the purity of each color when the pixels are displayed in red, green, blue, cyan, magenta, yellow, and white individually.

Since the homogeneous nematic liquid crystals are used in the liquid crystal layers 60•61, light can be double-refracted in a more idealistic manner compared with a case where the homeotropic nematic liquid crystals are used. As a result, multi-color display exploiting the birefringence effect can be realized more efficiently, thereby facilitating a color display.

The liquid crystal display device explained in the present as an example was of a reflective type. However, the present invention is not limited to the reflective type and the present invention may be applicable to a transmission type as well.

[FIFTH EMBODIMENT]

Referring to FIG. 5 and FIGS. 11 through 13, the following description will discuss still another embodiment of the present invention. Like components are labelled with like numerals with respect to the first and fourth embodiments and the explanation of these components is not repeated for the explanation's convenience.

Unlike the fourth embodiment in which a multi-color display was obtained by exploiting the birefringence effect realized by the homogeneous alignment of the nematic liquid crystals, a multi-color display is obtained by exploiting the birefringence effect realized by the twisted nematic liquid crystals in this embodiment.

Figure 11:
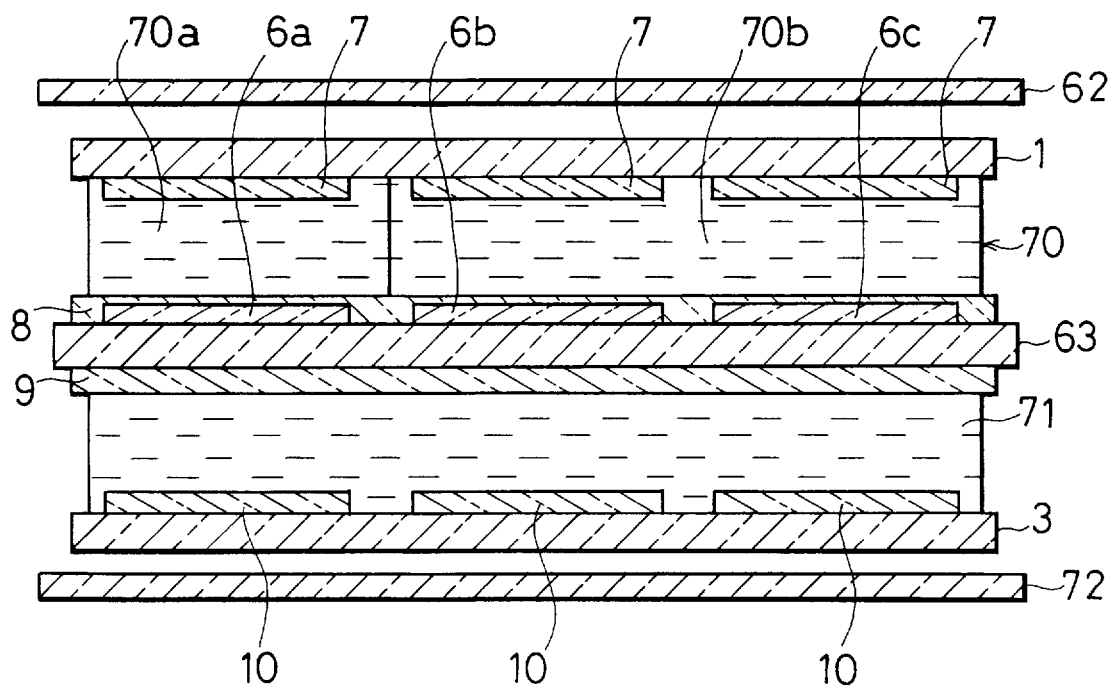
FIG. 11 is a cross sectional view of still another liquid crystal display device of the present invention.

A liquid crystal display device of the present embodiment is of a transmission type, and as shown in FIG. 11, a liquid crystal layer 70 made of twisted nematic liquid crystals twisted 240° is provided between the transparent substrates 1 and 63 instead of the liquid crystal layer 60 used in the counterpart of the fourth embodiment, and a liquid crystal layer 71 made of twisted nematic liquid crystals twisted 240° is provided between the transparent substrates 63 and 3 instead of the liquid crystal layer 61 used in the counterpart of the fourth embodiment. Also, a liner polarizing plate 72 is provided on an outer surface (lower surface in the drawing) side of the transparent substrate 3 instead of the reflecting plate 64.

The liquid crystal layer 70 is divided into two areas 70a and 70b, and the liquid crystals in each area are aligned in different directions. That is to say, the liquid crystals in each area are aligned in different directions, so that different colors will be displayed. The alignment of the liquid crystals in each area is controlled separately using the mask rubbing method as the manufacturing method.

In contrast, the liquid crystal layer 71 is not divided, and the liquid crystals therein are aligned in a single direction. Thus, different colors can be displayed when the retardation and optical rotatory dispersion in each image element area are changed by controlling the applied voltages to the image element areas.

In the above-structured liquid crystal display device, each of the liquid crystal layers 70•71 shows interference colors due to the birefringence interference and optical rotatory dispersion, and the interference colors can be changed when the retardation and optical rotatory characteristics are varied by applying voltages from pairs of the transparent electrodes 7•8 and 9•10. More specifically, bright color display in white, black, red, green, blue, cyan, magenta, and yellow can be obtained by combining the liquid crystal layers 70 and 71 having the color display characteristics set forth in TABLE 17 below with the cyan color filter 6a, magenta color filter 6b, and yellow color filter 6c.

TABLE 17

| | FILTER 6a (CYAN) | FILTER 6b (MAGENTA) | FILTER 6c (YELLOW) |
|---|---|---|---|
| LC LAYER 70 | B:TRANSMITTABLE G:CHANGEABLE R:UNMENTIONED | B:CHANGEABLE G:UNMENTIONED R:TRANSMITTABLE | B:UNMENTIONED G:CHANGEABLE R:TRANSMITTABLE |
| LC LAYER 71 | B:CHANGEABLE G:TRANSMITTABLE R:UNMENTIONED | B:TRANSMITTABLE G:UNMENTIONED R:CHANGEABLE | B:UNMENTIONED G:TRANSMITTABLE R:CHANGEABLE |

In TABLE 17, capital letters B, G, and R stand for blue, green, and red, respectively, and "transmittable" means the liquid crystal layer always transmits light of a concerning color, "changeable" means whether the liquid crystal layer transmits light of the concerning color or not can be changed, and "unmentioned" means whether the concerned color passes through the liquid crystal layer or not is negligible.

To render the color display characteristics set forth in TABLE 17 to the liquid crystal layers 70•71, the properties of the liquid crystal layers 70•71 are specified as set forth in TABLE 18 below, assuming that the polarizing direction of the polarizing plate 62 is 0° and a clockwise direction is positive.

A pixel is displayed red when the applied voltages are controlled in such a manner that the liquid crystals have a combination of retardation for transmitting the light of colors as set forth in TABLE 19 below.

TABLE 18

|    |                                         | FILTER 6a (CYAN) | FILTER 6b (MAGENTA) | FILTER 6c (YELLOW) |
|----|-----------------------------------------|------------------|---------------------|--------------------|
| 70 | POLARIZING PLATE 62'S POLARIZING DIRECTION | 0°               | 0°                  | 0°                 |
|    | LC'S ALIGNMENT DIRECTION ON SUBSTRATE 1 | −90°             | −130°               | −130°              |
|    | LC'S ALIGNMENT DIRECTION ON SUBSTRATE 63 | 130°             | 90°                 | 90'0               |
|    | LC'S TWIST ANGLE                        | 240°             | 240°                | 240°               |
|    | RETARDATION (Δn · d)                    | 600 nm           | 600 nm              | 600 nm             |
|    | SUBSTRATE 63'S POLARIZING DIRECTION     | 30°              | 30°                 | 30°                |
| 71 | LC'S ALIGNMENT DIRECTION ON SUBSTRATE 63 | −200°            | −200°               | −200°              |
|    | LC'S ALIGNMENT DIRECTION ON SUBSTRATE 3 | 40°              | 40°                 | 40°                |
|    | LC'S TWIST ANGLES                       | 240°             | 240°                | 240°               |
|    | RETARDATION (Δn · d)                    | 1400 nm          | 1400 nm             | 1400 nm            |
|    | POLARIZING PLATE 72'S POLARIZING DIRECTION | 60°            | 60°                 | 60°                |

Figure 12A:
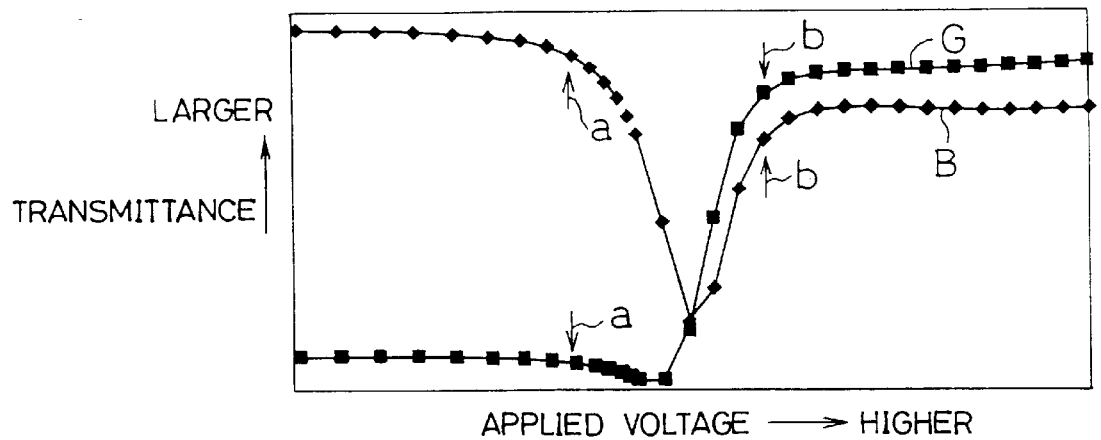
FIGS. 12(a) through 12(c) are graphs of a voltage-transmittance curve in each wavelength with the above liquid crystal display device.
Figure 12B:
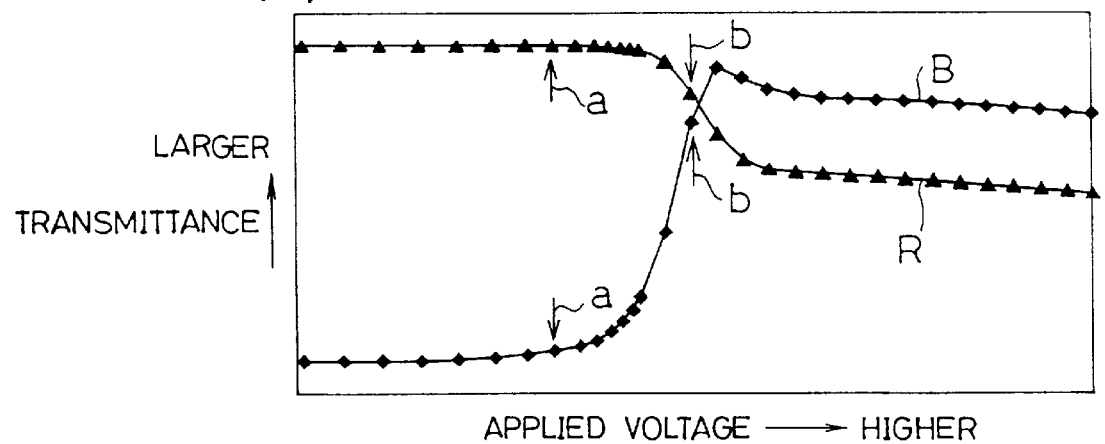
Figure 12C:
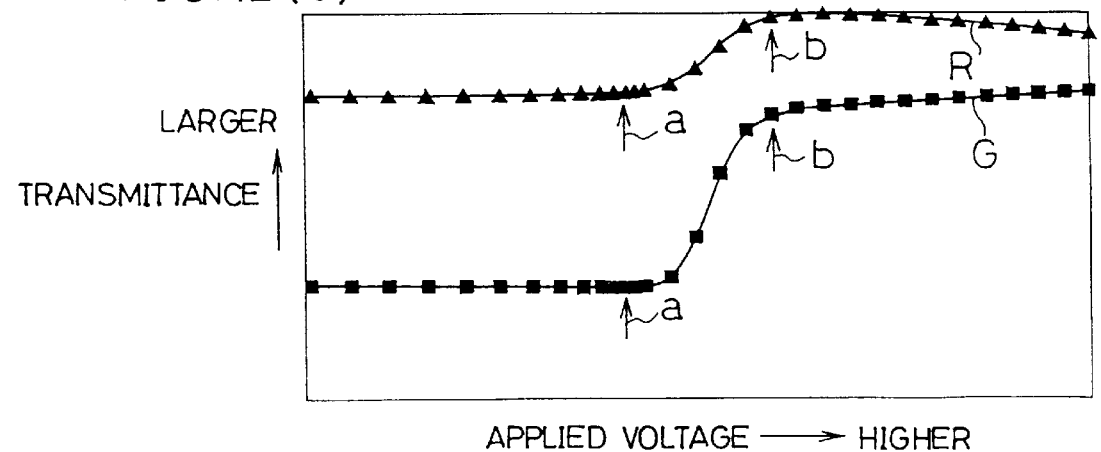

FIG. 12(*a*) is a graph showing a simulation curve of voltages versus transmittance of the image element corresponding to the cyan color filter 6a of the liquid crystal layer 70 for green light and blue light under the conditions set forth in TABLE 18. FIG. 12(*b*) is a graph showing a simulation curve of voltages versus transmittance of the image element corresponding to the magenta color filter 6b of the liquid crystal layer 70 for red light and blue light under the conditions set forth in TABLE 18. FIG. 12(*c*) is a graph showing a simulation curve of voltages versus transmittance of the image element corresponding to the yellow color filter 6c of the liquid crystal layer 70 for red light and green light under the conditions set forth in TABLE 18.

Figure 13A:
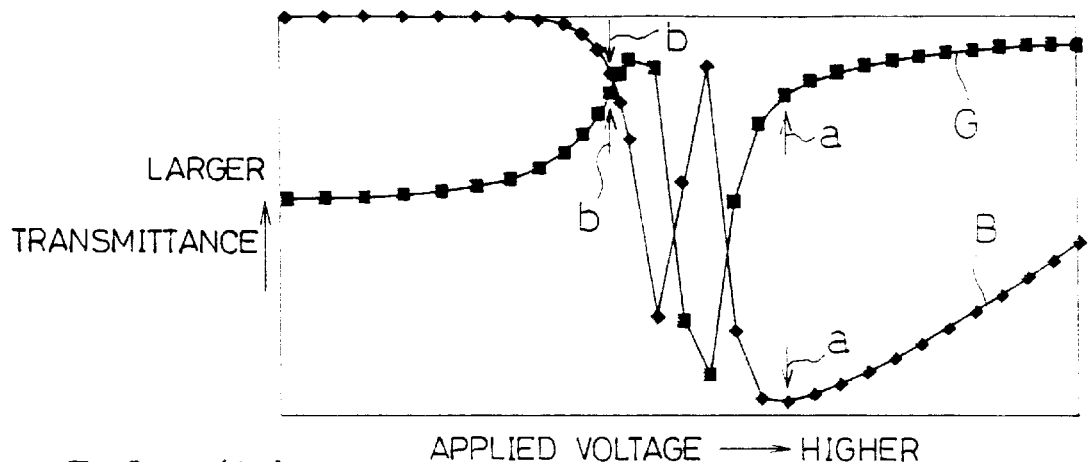
FIGS. 13(a) through 13(c) are other graphs of a voltage-transmittance curve in each wavelength with the above liquid crystal display device.
Figure 13B:
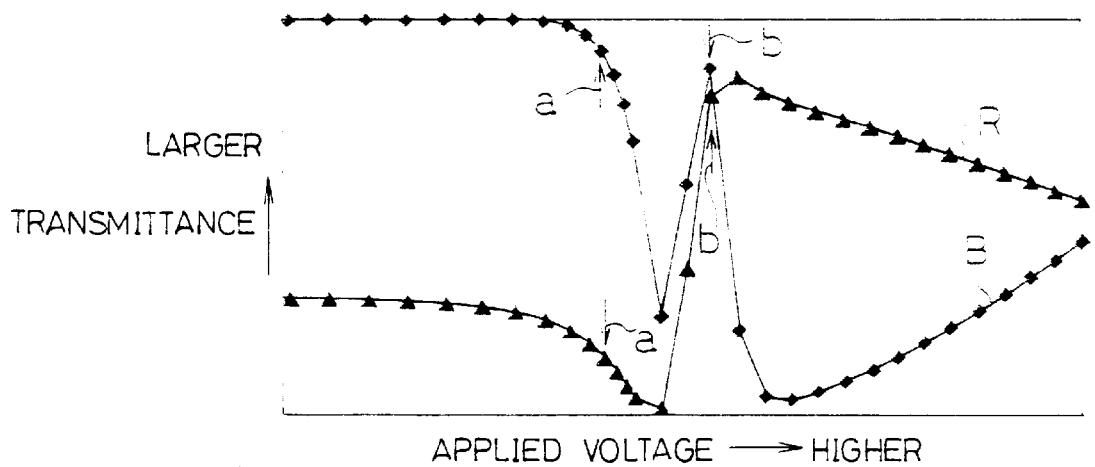
Figure 13C:
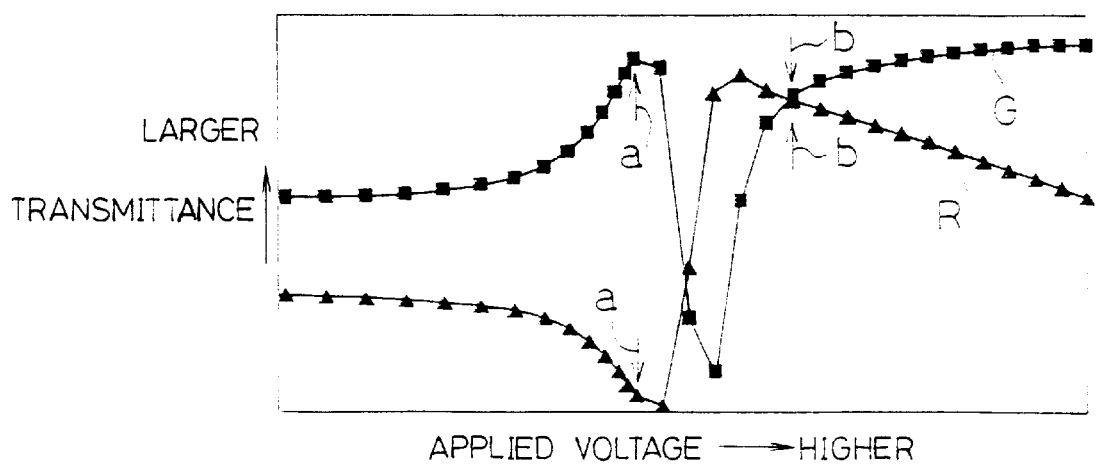

Similarly, FIG. 13(*a*) is a graph showing a simulation curve of voltages versus transmittance of the image element corresponding to the cyan color filter 6a of the liquid crystal layer 71 for green light and blue light under the conditions set forth in TABLE 18. FIG. 13(*b*) is a graph showing a simulation curve of voltages versus transmittance of the image element corresponding to the magenta color filter 6b of the liquid crystal layer 71 for red light and blue light under the conditions set forth n TABLE 18. FIG. 13(*c*) is a graph showing a simulation curve of voltages versus transmittance of the image element corresponding to the yellow color filter 6c of the liquid crystal layer 71 for red light and green light under the conditions set forth in TABLE 18.

The birefringence interference colors set forth in TABLE 17 can be changed by selecting voltages indicated by arrows a•b in the simulation curves shown in FIGS. 12(*a*) through 12(*c*) and FIGS. 13(*a*) through 13(*c*). For example, when blue light alone is to be passed through the image element corresponding to the cyan color filter 6a, then voltages indicated by the arrows a are selected, and when blue light and green light are to be passed through the same image element, then voltages indicated by the arrows b are selected.

In the following, a color displayed by a pixel based on transmitted light from the liquid crystal layers 70•71 for each image element is set forth in TABLEs 19 through 26 below.

TABLE 19

DISPLAY IN RED

|                          | FILTER 6a (CYAN)          | FILTER 6b (MAGENTA)        | FILTER 6c (YELLOW)         |
|--------------------------|---------------------------|----------------------------|----------------------------|
| LIQUID CRYSTAL LAYER 70  | TRANSMITS BLUE ALONE      | TRANSMITS RED ALONE        | TRANSMITS RED ALONE        |
| LIQUID CRYSTAL LAYER 71  | TRANSMITS GREEN ALONE     | TRANSMITS BLUE & RED       | TRANSMITS GREEN & RED      |
| COLOR OF TRANSMITTED LIGHT | BLACK                   | RED                        | RED                        |

The pixel is displayed in green when the applied voltages are controlled in such a manner that the liquid crystals have a combination of retardation for transmitting the light of colors as set forth in TABLE 20 below.

TABLE 20

DISPLAY IN GREEN

|                          | FILTER 6a (CYAN)          | FILTER 6b (MAGENTA)        | FILTER 6c (YELLOW)         |
|--------------------------|---------------------------|----------------------------|----------------------------|
| LIQUID CRYSTAL LAYER 70  | TRANSMITS BLUE & GREEN    | TRANSMITS RED ALONE        | TRANSMITS RED & GREEN      |
| LIQUID CRYSTAL LAYER 71  | TRANSMITS GREEN ALONE     | TRANSMITS BLUE ALONE       | TRANSMITS GREEN ALONE      |
| COLOR OF TRANSMITTED LIGHT | GREEN                   | BLACK                      | GREEN                      |

The pixel is displayed in blue when the applied voltages are controlled in such a manner that the liquid crystals have a combination of retardation for transmitting the light of colors as set forth in TABLE 21 below.

TABLE 21

DISPLAY IN BLUE

|  | FILTER 6a (CYAN) | FILTER 6b (MAGENTA) | FILTER 6c (YELLOW) |
|---|---|---|---|
| LIQUID CRYSTAL LAYER 70 | TRANSMITS BLUE ALONE | TRANSMITS BLUE & RED | TRANSMITS RED ALONE |
| LIQUID CRYSTAL LAYER 71 | TRANSMITS BLUE & GREEN | TRANSMITS BLUE ALONE | TRANSMITS GREEN ALONE |
| COLOR OF TRANSMITTED LIGHT | BLUE | BLUE | BLACK |

The pixel is displayed in cyan when the applied voltages are controlled in such a manner that the liquid crystals have a combination of retardation for transmitting the light of colors as set forth in TABLE 22 below.

TABLE 22

DISPLAY IN CYAN

|  | FILTER 6a (CYAN) | FILTER 6b (MAGENTA) | FILTER 6c (YELLOW) |
|---|---|---|---|
| LIQUID CRYSTAL LAYER 70 | TRANSMITS BLUE & GREEN | TRANSMITS BLUE & RED | TRANSMITS RED & GREEN |
| LIQUID CRYSTAL LAYER 71 | TRANSMITS BLUE & GREEN | TRANSMITS BLUE ALONE | TRANSMITS GREEN ALONE |
| COLOR OF TRANSMITTED LIGHT | CYAN | BLUE | GREEN |

The pixel is displayed in magenta when the applied voltages are controlled in such a manner that the liquid crystals have a combination of retardation for transmitting the light of colors as set forth in TABLE 23 below.

TABLE 23

DISPLAY IN MAGENTA

|  | FILTER 6a (CYAN) | FILTER 6b (MAGENTA) | FILTER 6c (YELLOW) |
|---|---|---|---|
| LIQUID CRYSTAL LAYER 70 | TRANSMITS BLUE ALONE | TRANSMITS RED & BLUE | TRANSMITS RED ALONE |
| LIQUID CRYSTAL LAYER 71 | TRANSMITS BLUE & GREEN | TRANSMITS RED & BLUE | TRANSMITS GREEN & RED |
| COLOR OF TRANSMITTED LIGHT | BLUE | MAGENTA | RED |

The pixel is displayed in yellow when the applied voltages are controlled in such a manner that the liquid crystals have a combination of retardation for transmitting the light of colors as set forth in TABLE 24 below.

TABLE 24

DISPLAY IN YELLOW

|  | FILTER 6a (CYAN) | FILTER 6b (MAGENTA) | FILTER 6c (YELLOW) |
|---|---|---|---|
| LIQUID CRYSTAL LAYER 70 | TRANSMITS BLUE & GREEN | TRANSMITS RED ALONE | TRANSMITS RED & GREEN |
| LIQUID CRYSTAL LAYER 71 | TRANSMITS GREEN ALONE | TRANSMITS RED & BLUE | TRANSMITS RED & GREEN |
| COLOR OF TRANSMITTED LIGHT | GREEN | RED | YELLOW |

The pixel is displayed in black when the applied voltages are controlled in such a manner that the liquid crystals have a combination of retardation for transmitting the light of colors as set forth in TABLE 25 below.

TABLE 25

DISPLAY IN BLACK

|  | FILTER 6a (CYAN) | FILTER 6b (MAGENTA) | FILTER 6c (YELLOW) |
|---|---|---|---|
| LIQUID CRYSTAL LAYER 70 | TRANSMITS BLUE ALONE | TRANSMITS RED ALONE | TRANSMITS RED ALONE |
| LIQUID CRYSTAL LAYER 71 | TRANSMITS GREEN ALONE | TRANSMITS BLUE ALONE | TRANSMITS GREEN ALONE |
| COLOR OF TRANSMITTED LIGHT | BLACK | BLACK | BLACK |

The pixel is displayed in white when the applied voltages are controlled in such a manner that the liquid crystals have a combination of retardation for transmitting the light of colors as set forth in TABLE 26 below.

TABLE 26

DISPLAY IN WHITE

|  | FILTER 6a (CYAN) | FILTER 6b (MAGENTA) | FILTER 6c (YELLOW) |
|---|---|---|---|
| LIQUID CRYSTAL LAYER 70 | TRANSMITS BLUE & GREEN | TRANSMITS RED & BLUE | TRANSMITS RED & GREEN |
| LIQUID CRYSTAL LAYER 71 | TRANSMITS BLUE & GREEN | TRANSMITS RED & BLUE | TRANSMITS RED & GREEN |
| COLOR OF TRANSMITTED LIGHT | CYAN | MAGENTA | YELLOW |

As shown in TABLEs 19 through 24, two primary colors out of three pass through each color filter, and two image elements out of three are displayed in the same colors. Thus, like the first and fourth embodiments, a full-color liquid crystal display device of the present embodiment can double not only the utilization efficiency of incident light, but also the brightness compared with a case where the conventional red, blue, and green filters are used.

The transmission type liquid crystal display device of the present embodiment using the CMY filter and a conventional liquid crystal display device using the RGB filter are compared in terms of the dependency of the utilization efficiency on the incident light's wavelength when the pixel is displayed in white, and the result of which is shown in FIG. 5. As shown in FIG. 5, the utilization efficiency (brightness) in the liquid crystal display device of the present embodiment in increased two-fold compared with the conventional liquid crystal display device when the pixel is displayed in white as was in the first and fourth embodiments.

In addition, the brightness is increased two-fold without impairing the purity of each color when the pixels are displayed in red, green, blue, cyan, magenta, yellow, and white individually.

Also, since the liquid crystal layers 70•71 are made of twisted liquid crystals twisted 240°, they can be driven by the multiplex-multiplex drive. When the twist angle is less than 180°, the steepness of a curve representing the applied voltage-transmittance characteristics is degraded. Thus, it is preferable to set the twist angle in a range between 180° and 360° inclusive, because the applied voltage-transmittance characteristics curve shows excellent steepness if the twist angle is within the above-specified range.

[SIXTH EMBODIMENT]

Figure 14:
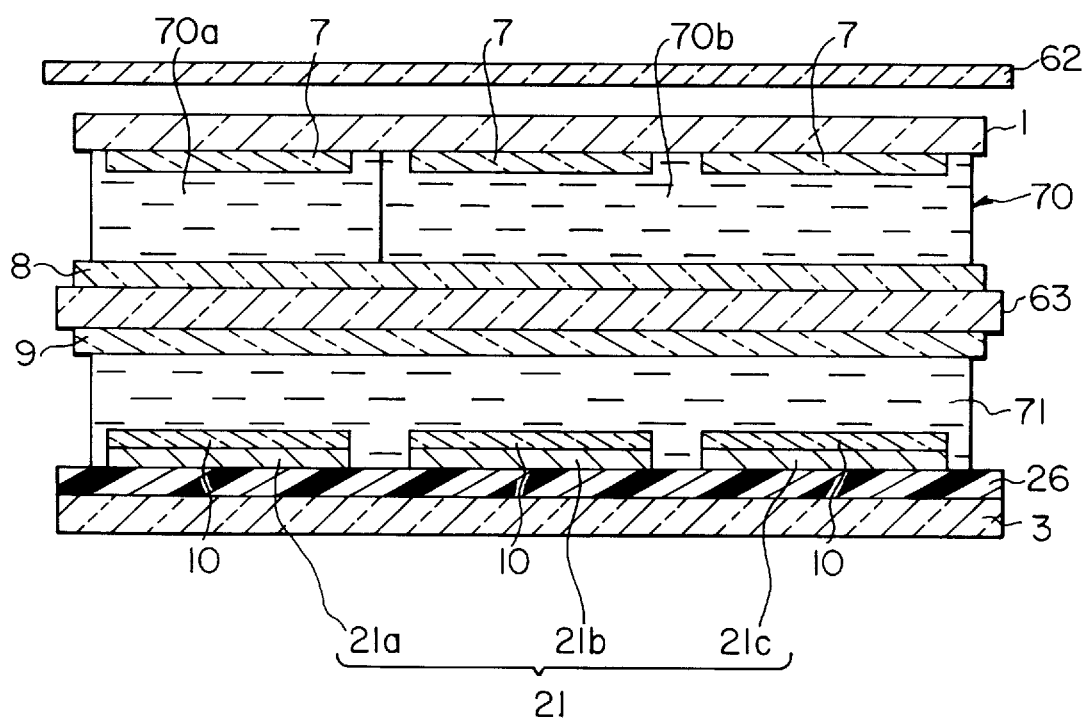
FIG. 14 is a cross sectional view of still another liquid crystal display device of the present invention.
Figure 15:
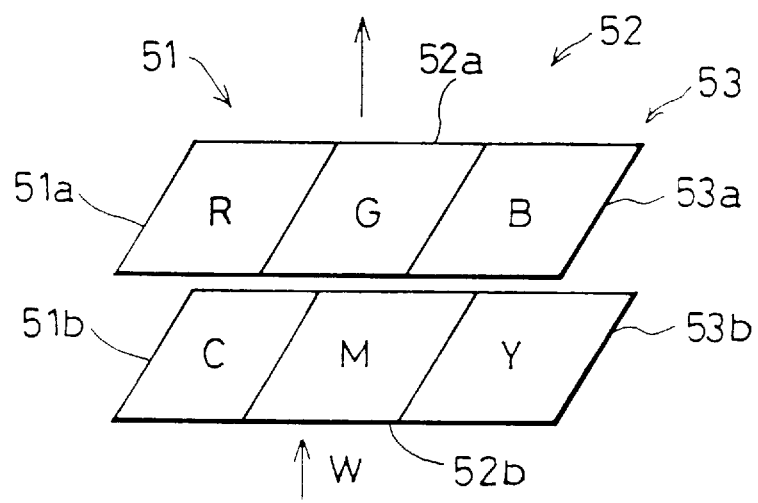
FIG. 15 is a view explaining a conventional double-layer type liquid crystal display device.
Figure 16:
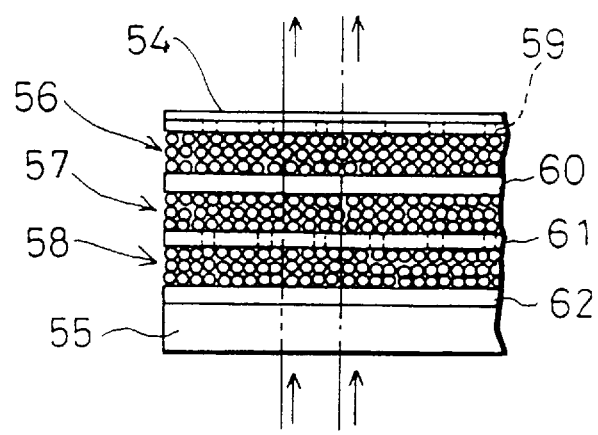
FIG. 16 is a cross sectional view of a conventional triple-layer type liquid crystal display device.

Referring to FIG. 14, the following description will discuss still another embodiment of the present invention. Like components are labelled with like numerals with respect to the first, second, and fourth embodiments and the explanation of these components is not repeated for the explanation's convenience.

A liquid crystal display device of the present embodiment is of a reflective type. As shown in FIG. 14, the liquid crystal display device of the present embodiment is different from the counterpart of the fifth embodiment in that the dielectric mirror layer 21 of the second embodiment which reflects cyan light, magenta light, and yellow light is provided on a lower surface of the transparent electrode 10 instead of the color filter layer 6 of the fifth embodiment which transmits cyan light, magenta light, and yellow light, and the photo-absorbing layer 26 which absorbs incident light is provided between the dielectric mirror layer 21 and transparent substrate 3. The dielectric mirror layer 21, which is provided for each of three image elements forming a pixel, comprises the dielectric mirrors 21a, 21b, and 21c which reflect cyan light, magenta light, and yellow light, respectively.

In the above-structured liquid crystal display device, each of the liquid crystal layers 70•71 show interference colors due to the birefringence interference and optical rotatory dispersion, and the interference colors can be changed by changing the retardation and optical rotatory characteristics using applied voltages from pairs of the transparent electrodes 7•8 and 9•10.

More specifically, a bright display in colors including white, black, red, green, blue, cyan, magenta, and yellow can be realized when the liquid crystal layers 70 and 71 which render the color display characteristics as set forth in TABLE 17 are combined with the cyan color filter 6a, magenta color filter 6b, and yellow color filter 6c.

Compared with the reflective type liquid crystal display device of the fifth embodiment which includes the reflecting plate, the structure can be simplified as the dielectric mirror layer 21 per se serves as the reflecting plate as well as a color selector.

Each image element and pixel are displayed in specific colors corresponding to the states of the liquid crystal layers 70•71 in the same manner as the fifth embodiment, and the explanation thereof is omitted herein.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:
1. A liquid crystal display device comprising:
a filter layer said filter layer being solely a single filter layer, said single filter layer including a set of a cyan color filter portion, a magenta color filter portion, a yellow color filter portion for each pixel, each of said color filter portions being aligned in parallel with each other;
a first liquid crystal layer, provided for said color filter portions, for changing transmittance of light within a first range of wavelengths when an external electric field is applied thereto; and
a second liquid crystal layer, provided for said color filter portions, for changing transmittance of light within a second range of wavelength when an external electric field is applied thereto, said first range of wavelengths being different from said second range of wavelengths.
2. The liquid crystal display device as defined in claim 1, wherein said filter layer, first liquid crystal layer, and second liquid crystal layer are laminated in an arbitrary order.
3. The liquid crystal display device as defined in claim 2, wherein said first and second liquid crystal layers are nematic liquid crystal layers which change transmittance of light using a birefringence effect of liquid crystals when an external electric field is applied thereto, said first liquid crystal layer being formed between two polarizing layers, said second liquid crystal layers being formed between a polarizing layer and a reflecting layer.
4. The liquid crystal display as defined in claim 3, wherein at least one of said first and second liquid crystal layers is made of homogeneous liquid crystals.
5. The liquid crystal display as defined in claim 3, wherein at least one of said first and second liquid crystal layers is made of twisted liquid crystals whose twist angle is in a range between 180° and 360° inclusive.
6. The liquid crystal display as defined in claim 1, wherein said filter layer is made of a thin film member and provided between said first and second liquid crystal layers.
7. The liquid crystal display as defined in claim 1 further comprising a reflecting layer for reflecting transmitted light from said filter layer, first liquid layer, and second liquid layer.
8. The liquid crystal display as defined in claim 7, wherein said reflecting layer is composed of a light reflecting member and a reflecting electrode which applies an external electric field to one of said first and second liquid crystal layers.
9. The liquid crystal display as defined in claim 1 further comprising a reflecting layer for reflecting red light, green light, and blue light for said cyan color filter, magenta color filter, and yellow color filter, respectively, and for transmitting light of non-reflected colors, respectively.
10. The liquid crystal display device as defined in claim 1, wherein each of said first and second liquid crystal layers is divided into at least two areas, each area containing a different kind of dichroic dye.
11. The liquid crystal display device as defined in claim 10, wherein a density of each dichroic dye is in a range between one percent by weight and ten percent by weight inclusive.
12. The liquid crystal display device as defined in claim 1, wherein said first and second liquid crystal layers are nematic liquid crystal layers which change transmittance of light using a birefringence effect of liquid crystals when an external electric field is applied thereto, said first liquid crystal layer and second liquid crystal layers being interposed in a lamination of three polarizing layers individually.

13. The liquid crystal display device as defined in claim 12, wherein at least one of said first and second liquid crystal layers is made of homogeneous liquid crystals.

14. The liquid crystal display device as defined in claim 12, wherein at least one of said first and second liquid crystal layers is made of twisted liquid crystals whose twist angle is in a range between 180° and 360° inclusive.

15. The liquid crystal display device as defined in claim 12, wherein at least one of said first and second liquid crystal layers includes two areas each having their respective alignments.

16. The liquid crystal display device as defined in claim 1 further comprising a pair of electrodes for, when said first and second liquid crystal layers are laminated adjacently, sandwiching said first and second liquid crystal layers, whereby said pair of electrodes apply the external electric fields to said first and second liquid crystal layers, respectively.

17. The liquid crystal display device as defined in claim 1 further comprising an electrode for applying electric fields to said first and second liquid crystal layers independently.

18. A liquid crystal display device comprising:
   a first liquid crystal layer for changing transmittance of light within a first range of wavelengths when an external electric field is applied thereto;
   a second liquid crystal layer for changing transmittance of light within a second range of wavelength when an external electric field is applied thereto, said first range of wavelengths being different from said second range of wavelengths; and
   a reflecting layer having a member that reflects cyan light, magenta light, and yellow light of transmitted light from said first and second liquid crystal layers, said member being provided for each pixel.

19. The liquid crystal display device as defined in claim 18 further comprising a photo-absorbing member for absorbing transmitted light from said reflecting layer.

20. The liquid crystal display device as defined in claim 18, wherein each of said first and second liquid crystal layers is divided into at least two areas, each area containing their respective dichroic dyes.

21. The liquid crystal display device as defined in claim 18, wherein said first and second liquid crystal layers are nematic liquid crystal layers which change transmittance of light using a birefringence effect of liquid crystals when an external electric field is applied thereto, said first liquid crystal layer being formed between two polarizing layers, said second liquid crystal layers being formed between a polarizing layer and said reflecting layer.

22. The liquid crystal display device as defined in claim 21, wherein at least one of said first and second liquid crystal layers is made of homogeneous liquid crystals.

23. The liquid crystal display device as defined in claim 21, wherein at least one of said first and second liquid crystal layers is made of twisted liquid crystals whose twist angle is in a range between 180° and 360° inclusive.

24. The liquid crystal display device as defined in claim 18 further comprising a pair of electrodes for, when said first and second liquid crystal layers are laminated adjacently, sandwiching said first and second liquid crystal layers, whereby said pair of electrodes apply the external electric fields to said first and second liquid crystal layers, respectively.

25. The liquid crystal display device as defined in claim 18 further comprising an electrode for applying electric fields to said first and second liquid crystal layers independently.

* * * * *